(12) United States Patent
Ide et al.

(10) Patent No.: US 6,692,607 B2
(45) Date of Patent: Feb. 17, 2004

(54) METHOD OF MANUFACTURING A MOLDED MULTILAYER ARTICLE

(75) Inventors: Akinori Ide, Fujinomiya (JP); Takehiro Yamamoto, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/777,698

(22) Filed: Feb. 7, 2001

(65) Prior Publication Data

US 2001/0011782 A1 Aug. 9, 2001

Related U.S. Application Data

(62) Division of application No. 09/050,911, filed on Mar. 31, 1998, now Pat. No. 6,186,765.

(30) Foreign Application Priority Data

| Mar. 31, 1997 | (JP) | 9/80868 |
| Mar. 31, 1997 | (JP) | 9/80869 |
| Mar. 31, 1997 | (JP) | 9/80870 |
| Mar. 31, 1997 | (JP) | 9/80871 |
| Nov. 11, 1997 | (JP) | 9-309027 |

(51) Int. Cl.[7] .............................................. B29C 47/00
(52) U.S. Cl. ................. 156/244.18; 156/348; 264/45.9; 264/148
(58) Field of Search ....................... 156/244.11, 244.18, 156/244.19, 244.27, 348, 360; 264/45.9, 46.1, 259, 148

(56) References Cited

U.S. PATENT DOCUMENTS

| 3,733,381 A | 5/1973 | Willette et al. |
| 3,802,985 A | * 4/1974 | Leatherman ........... 156/244.25 |
| 4,459,093 A | * 7/1984 | Asano ........................ 264/148 |
| 4,767,486 A | * 8/1988 | Nakajima et al. ...... 156/244.11 |
| 4,873,045 A | * 10/1989 | Fujita et al. ........... 156/244.24 |
| 4,978,289 A | * 12/1990 | Maejima ..................... 425/141 |
| 5,382,148 A | * 1/1995 | Buckley .................. 156/275.5 |
| 5,500,170 A | 3/1996 | Okumura et al. |
| 5,958,164 A | 9/1999 | Ishiwatari et al. |
| 5,961,902 A | * 10/1999 | Ishitoya et al. ............... 156/79 |

FOREIGN PATENT DOCUMENTS

| JP | 57-17931 | 1/1982 |
| JP | 60-44124 | 3/1985 |
| JP | 63-137814 | 6/1988 |
| JP | 5-2491 | 1/1993 |
| JP | 5-24128 | 2/1993 |

OTHER PUBLICATIONS

PCT WO96/30185 Mar. 1996 Ishitoya et al.*

* cited by examiner

*Primary Examiner*—Jeff H. Aftergut
*Assistant Examiner*—John L. Goff
(74) *Attorney, Agent, or Firm*—Pillsbury Winthrop LLP

(57) ABSTRACT

Molten polymers are forced into T dies combined to form a multiple T die, the molten polymers are extruded through the T dies as monolayers. The monolayers extruded through the T dies are superposed and laminated outside the multiple T die while the polymers are in a molten or semi-molten state to form a intermediate molten multilayer. The multiple T die is advanced into a space between an open top half mold and a bottom half mold of a compression mold to deliver the intermediate multilayer onto the bottom half mold. The intermediate multilayer is cut to a predetermined length on the bottom half mold, and is processed for compression molding in the compression mold to form a multilayer article. A molding cycle for molding the multilayer article is carried out automatically at a remarkably improved manufacturing efficiency.

13 Claims, 23 Drawing Sheets

METHOD OF MANUFACTURING A MOLDED MULTILAYER ARTICLE

This is a division of Application Ser. No. 09/050,911, filed Mar. 31, 1998 now U.S. Pat. No. 6,186,765.

BACKGROUND OF THE INVENTION

1. Field of the Invention

The present invention relates to a method of manufacturing a molded multilayer article and an apparatus therefor. More specifically, the present invention relates to a method and an apparatus which is capable of efficiently producing molded multilayer articles in a wide variety of sizes and shapes by combining a process of laminating a plurality of a extruded molten polymer layers and a process of compression molding.

2. Description of the Related Art

Known processes of manufacturing a monolayer article of a thermoplastic polymer adapt a combination of an injection molding process and a press forming process, or a combination of an extrusion molding process and a vacuum forming process for shaping a film or sheet into a article with a relatively broad width and a complicated three-dimensional shape.

A sheet is formed by extruding a molten polymer through an extrusion die, and successively the sheet is fed to molds for a compression molding process. Therefore, the extrusion die and the associated parts must be moved toward the molds. Various devices adapted for moving an extrusion die along a predetermined path over the bottom half mold of an open mold have been disclosed, for example, in JPB No. 17931/1982 and JPA No. 137814/1988.

A stampable sheet molding process applied to processes for producing that kind of sheet products is one of the known processes. In the stampable sheet molding process, a sheet formed by extrusion is cut into a workpiece with a predetermined size, and the workpiece is softened by heating and delivered to final molding process on a compression molding machine. Such a processing method comprises steps of extrusion, forming, cutting process, heating process, and compression molding. However, additional electric power consumption is increased for heating process and limited varieties of shape of the products to be processed by the compression molding is one of the drawbacks.

The extrusion die employed in those known techniques has a die slot opening of a fixed dimension. Therefore the extrusion die can be used only for extruding a sheet of a predetermined fixed width and is not applicable to extrusion of a sheet with varying width and thickness.

An apparatus disclosed in JPB No. 25689/1989 is adapted for molding finished sheet products with varying width by extruding a sheet with varying width, which is feed to compression molding machines.

This apparatus is capable of changing the sectional shape of a sheet which is extruded through a die disposed opposite to the compression molding machine according to the shape of an finished product.

The foregoing prior art techniques relate to monolayer articles. One kind of molded articles has a structure of laminated layers consisting of sheets or films in different in strength, hardness, color or such. For example, one of molded multilayers articles consists of a base layer, a mid-layer and a skin layer.

Prior art methods of manufacturing molded multilayer articles of the abovementioned kind and apparatus therefor are disclosed in JPB No. 2491/1993 and JPA No.24128/1993. In these prior art a multilayer sheet is formed by co-extruding molten polymers through a multilayer T (slot) die, and the multilayers sheet are fed to molds of a compression molding machine for the subsequent compression molding process.

Since the multilayer sheet is formed in the multilayer T die, it is difficult to control the respective temperatures of the monolayer sheets individually. Particularly, it is difficult to hold the mid-layer containing a foaming agent at a temperature which will not cause the foaming agent to produce foams until the multilayer sheet is subjected to a compression molding process because the mid-layer is heated by the adjacent layers of molten polymers and the T die.

A cutting process for a sheet formed by extruding molten polymer through T die is disclosed in JPB No.44124/1985. In this cutting process, the sheet is cut to a length by moving a cutting blade in a direction perpendicular to the width of the sheet at the die slot opening of the T die.

When the sheet is cut by such a manner that the molten polymer has a tendency to adhere to part of the T die around the die slot opening, the scorched polymer is liable to adhere to the surface of the sheet, the cutting blade becomes dull due to heating at a high temperature, and the molten polymer is liable to adhere also to the cutting blade during the sheet cutting process.

Because the molten polymer is in a state that has a low viscosity and highly adhesive in a sheet cutting process, difficulty in cutting the sheet by the cutting blade will be enhanced. Therefore, a cleaning means must be disposed near the cutting blade and the cutting blade needs relatively frequent cleaning so that the molten polymer may not adhere to the cutting blade kept on standby near the die slot opening of the T die.

Cleaning of the cutting blade increases the molding cycle time and reduces the efficiency of the manufacturing process greatly. If the cutting blade is not kept satisfactorily clean, the quality of moldings will be deteriorated.

The improvement of the efficiency of processes for manufacturing molded multilayersheet parts of complicated shapes has been a main problem that faces manufacturers. Particularly, in a case that a multilayer article consists of component sheets differing from each other in material, thickness and shape, it is impossible to achieve a series of processes including a extrusion process, a laminating process, a cutting process and a compression process by single reciprocating stroke of the T die.

SUMMARY OF THE INVENTION

Accordingly, it is an object of the present invention to provide a molded multilayer article manufacturing method which is capable of automatically carrying out a molding cycle including an extrusion process of extruding a plurality of monolayers through a plurality of T dies, a forming process of superposing and laminating the plurality of monolayers, and a compression molding process for a finished article of desired shape, and of carrying out the molding cycle at a very high manufacturing efficiency, and to provide a multilayersheet molding manufacturing apparatus for carrying out the method.

A second object of the present invention is to provide a molded multilayer article manufacturing method and apparatus capable of efficiently manufacturing a multilayer article consisting of a plurality of monolayers differing from each other in width, shape and such.

A third object of the present invention is to provide a method and apparatus capable of feeding a plurality of molten monolayers extruded through a plurality of T dies and quickly and smoothly cutting it to a desired length for a compression molding process to improve manufacturing efficiency.

According to one aspect of the present invention, a method for manufacturing a molded multilayer article by molding a multilayer sheet consisting of a plurality of polymer layers, comprises the steps of: extruding a plurality of monolayers of molten polymers by forcing the molten polymers into a multiple T die combined with a plurality of T dies so that the molten polymers are extruded respectively through the T dies; forming an intermediate molten multilayer by superposing and laminating the monolayers extruded through the T dies outside the multiple T die while the polymers are in a molten state or a semi-molten state; feeding the intermediate molten multilayer to a compression mold having the bottom half mold and a top half mold by advancing the multiple T die into a space between the bottom half mold and the top half mold;

cutting the intermediate molten multilayer to a predetermined length; and molding the intermediate molten multilayer in the compression mold into a multilayer article of a desired shape.

According to another aspect of the present invention, an apparatus for manufacturing a molded multilayer article by molding a multilayer sheet, comprises: a plastication means for separately plasticating polymers for forming each of monolayers, and feeding molten polymers by pressure; a multiple T die combined with a plurality of T dies for extruding the monolayers and jointed to the plastication means; moving means for moving the plastication means and the multiple T die all together; a laminating means provided with the multiple T die to form a intermediate molten multilayer by superposing and laminating the monolayers extruded in molten or semi-molten state; a cutting means provided with the multiple T die for cutting the intermediate molten multilayer in a predetermined length; and a compression molding means provided with a mold for molding the intermediate molten multilayer into a finished multilayer article of a desired shape.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Methods of manufacturing a molded multilayer article and apparatus therefor in accordance with the present invention will be described hereinafter with reference to the accompanying drawings.

1. Molded Multilayer Article Manufacturing Apparatus

Figure 1:
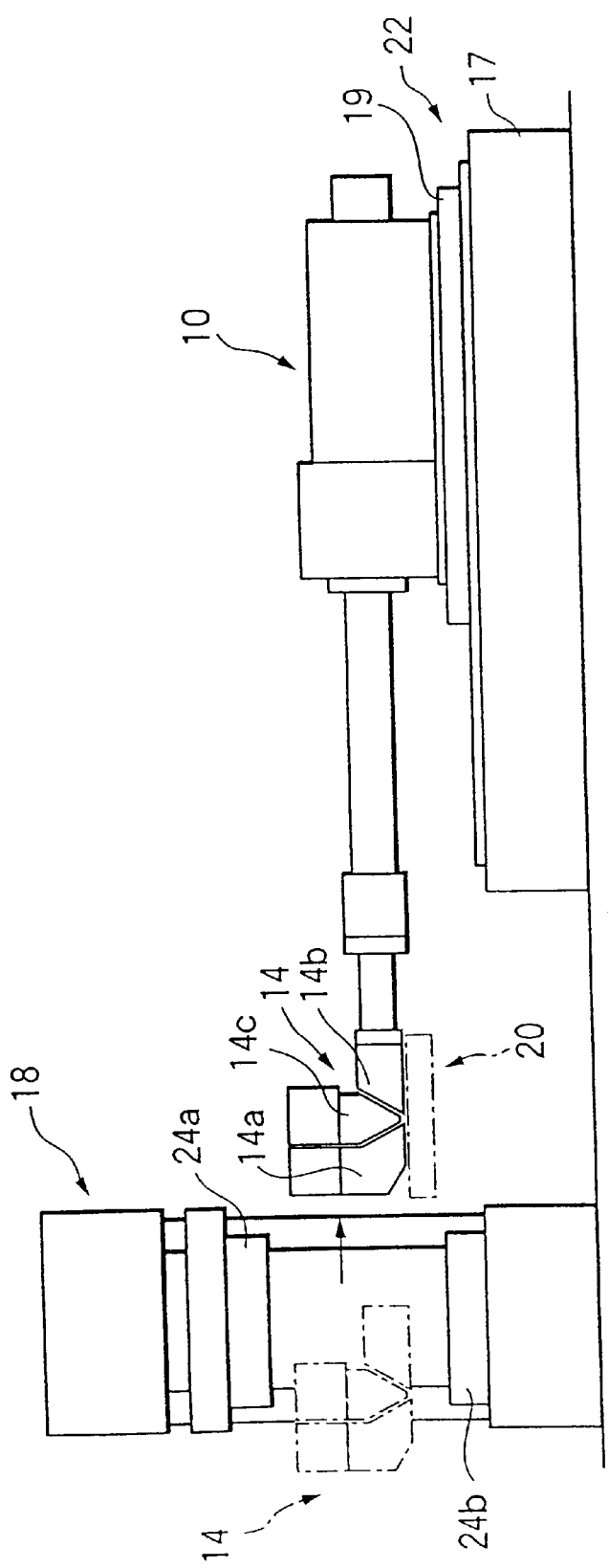
FIG. 1 is a schematic side view of a molded multilayer article manufacturing apparatus in a first embodiment according to the present invention.
Figure 2:
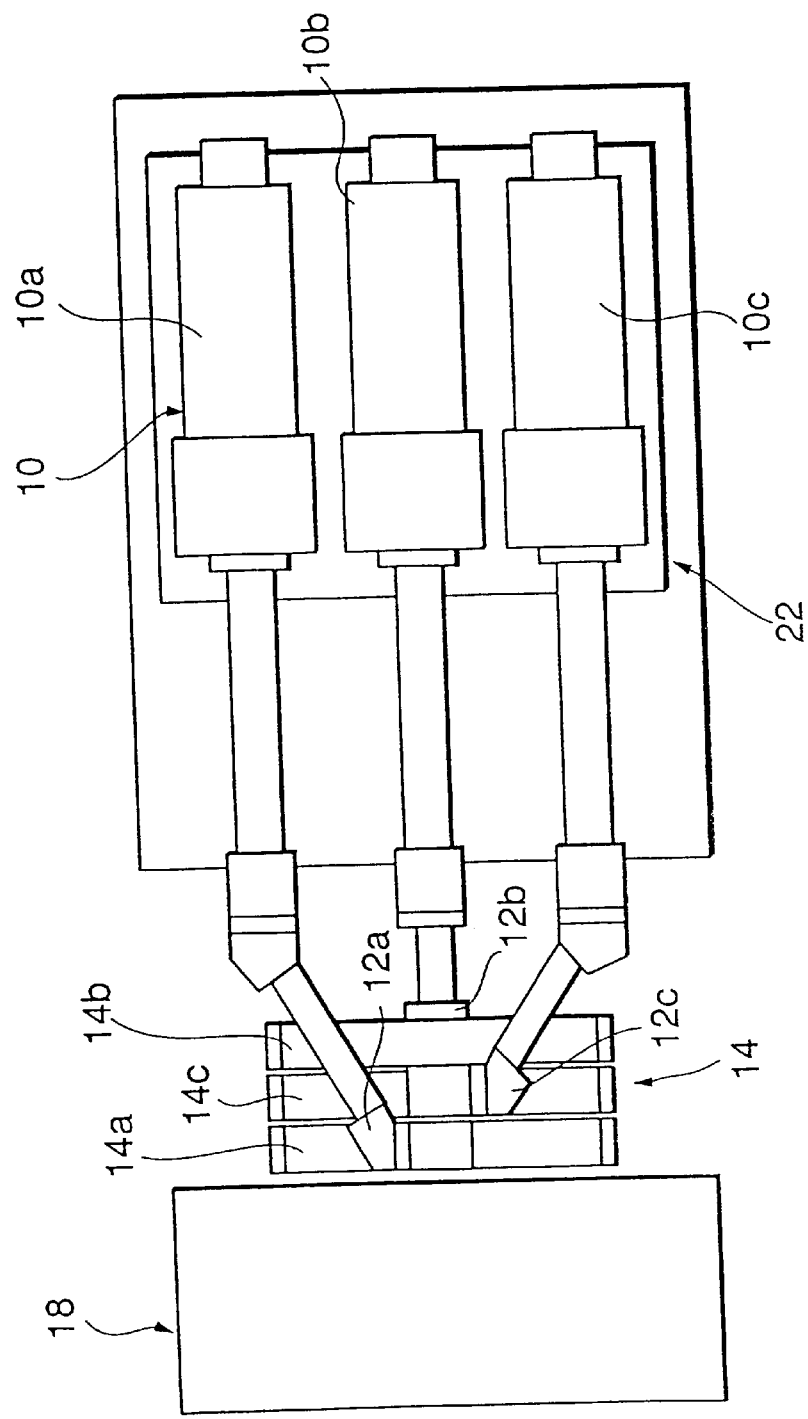
FIG. 2 is a schematic plan view of the molded multilayer article manufacturing apparatus in the first embodiment shown in FIG. 1.

FIGS. 1 to 7 show a molded multilayer article manufacturing apparatus in a first embodiment according to the present invention. The first embodiment will be described as applied to manufacturing a molded article with three layers. Numeral 10 represents a plastication means for plasticating a polymer material for each of the layers and applying pressure to each molten polymer to force it out. As shown in FIG. 2, an injection molding machine acting as the plastication means 10 is provided with three injection units 10a, 10b and 10c disposed in a parallel arrangement. The injection units 10a, 10b and 10c have delivery nozzles 12a, 12b and 12c, which are connected to T dies 14a, 14b and 14c(a slot die is referred to as the T die) respectively. The molten polymer is pushed through the T die 14a, 14b and 14c that shapes the molten polymer into a molten monolayer, respectively.

Figure 9:
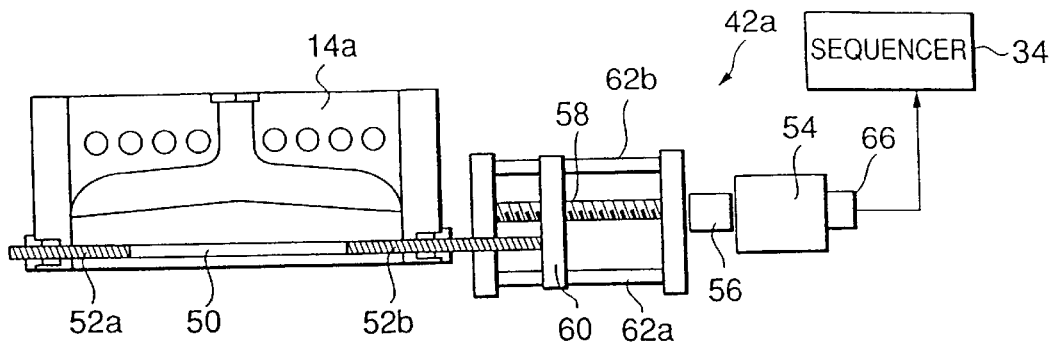
FIG. 9 is a schematic view of a die slot opening adjusting mechanism.

As shown in FIG. 9, the T dies 14a, 14b and 14c are provided with deckles for adjusting slot opening to adjust the widths of the molten monolayer extruded through the slot openings of the T dies 14a, 14b and 14c, respectively. The T dies 14a, 14b and 14c are assembled to construct a multiple T die 14. The polymers are formed into the molten monolayers by the extrusion through the T dies 14a, 14b and 14c of the T die 14 in a molten state or a semi-molten state. The polymer layers of the molten or semi-molten polymer are laminated to form a intermediate molten multilayer 16.

The intermediate molten multilayer 16 is cut to a predetermined length, and fed to a compression molding machine 18. The compression molding machine 18 is provided with a mold consisted of a top half mold 24a and a bottom half mold 24b, and a mold clamping mechanism to move the top half mold 24a vertically relative to the bottom half mold 24b and to close the mold tightly. The intermediate molten multilayer 16 is placed on the bottom half mold 24b, and then the top half mold 24a compresses the intermediate multilayer against the bottom half mold 24b to shape it into a desired form.

Referring to FIG. 1, the injection units 10a, 10b and 10c are mounted on a base 19 placed on a bed 17. The base 19 can be horizontally reciprocated by a base moving mechanism 22 provided with a drive motor (not shown) and rack and pinion mechanism (not shown), which are built in the bed 17. The multiple T die 14 is reciprocated together with the base 19 from a standby position indicated by continuous lines in FIG. 1 to a space between the open top half mold 24a and the bottom half mold 24b of the compression molding machine 18. A position of the multiple T die 14 indicated by alternate long and a short dash lines in FIG. 1 is the foremost position of the multiple T die where the feed of the intermediate molten multilayer to the bottom half mold 24b is started.

Thus, the multiple T die 14 can be moved together with the injection units 10a, 10b and 10c into and out of the space between the open top half mold 24a and the bottom half mold 24b.

Figure 3:
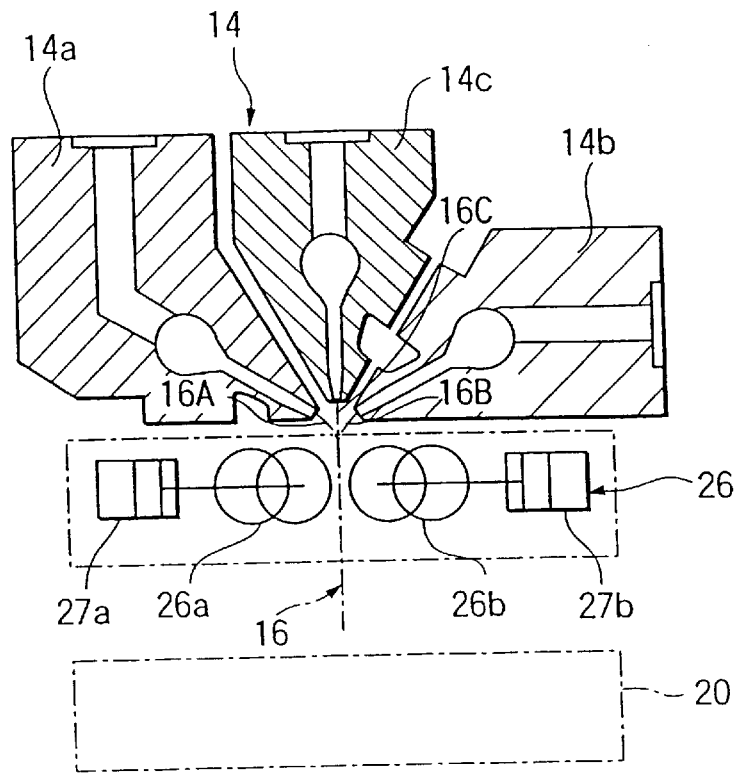
FIG. 3 is an enlarged sectional view of an essential part of a multiple T die included in the molded multilayer article manufacturing apparatus in the first embodiment shown in FIG. 1.

Referring to FIG. 3, a laminating mechanism 26 is disposed near the slot openings of the multiple T die 14 integrally therewith. The laminating mechanism 26 forms the intermediate molten multilayer 16 by laminating molten monolayers 16A, 16B and 16C extruded through the T dies 14a, 14b and 14c respectively. The laminating mechanism 26 is disposed upstream of a cutting mechanism 20 for cutting the intermediate molten multilayer 16 to a predetermined length with respect to a direction in which the intermediate molten multilayer 16 is delivered. The laminating mechanism 26 is provided with a pair of nip rollers 26a and 26b which sandwiches the mid-monolayer 16C between the outer monolayer 16A and 16B in a manner such that air may not be trapped between each monolayer 16A, 16B and 16C. Cylinder actuators 27a and 27b are connected to operate the nip rollers 26a and 26b. When the nip rollers 26a and 26b move toward each other, the monolayers 16A, 16B and 16C are pressed between the nip rollers 26a and 26b to form them into the laminated intermediate molten multilayer 16.

The laminating mechanism 26 is capable of dealing with a laminating operation for a predetermined intermittent pattern for forming an intermediate molten multilayer comprising pieces of the monolayers 16A 16B and 16C of different lengths. Multilayer articles having such intermittent patterns and shapes can be manufactured by moving the nip rollers 26a and 26b toward and away from each other according to the pattern.

Figure 5:
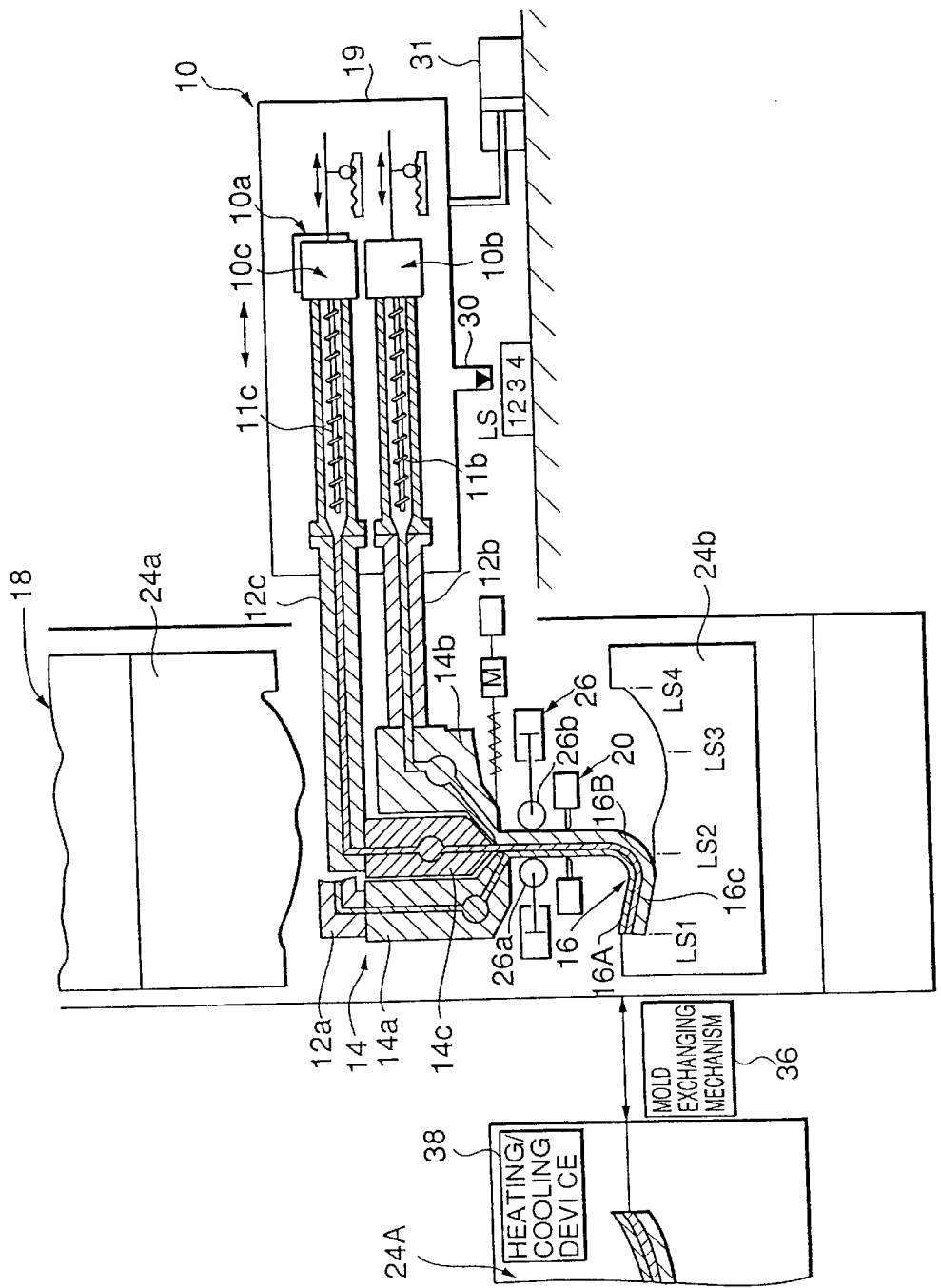
FIG. 5 is a typical longitudinal sectional view of an essential part of the molded multilayer article manufacturing apparatus in the first embodiment shown in FIG. 1.

The cutting mechanism 20 is disposed below the slot openings of the multiple T die 14 to cut off the intermediate molten multilayer 16. The cutting mechanism 20 and the laminating mechanism 26 are combined with the multiple T die 14 and are moved together with it. As shown in FIG. 5, the cutting mechanism 20 has a pair of cutting blades disposed on the opposite sides of the intermediate molten multilayer 16 to nip it off. Any suitable one of various modifications, which will be described later, of the cutting mechanism 20 may be employed.

Figure 7:
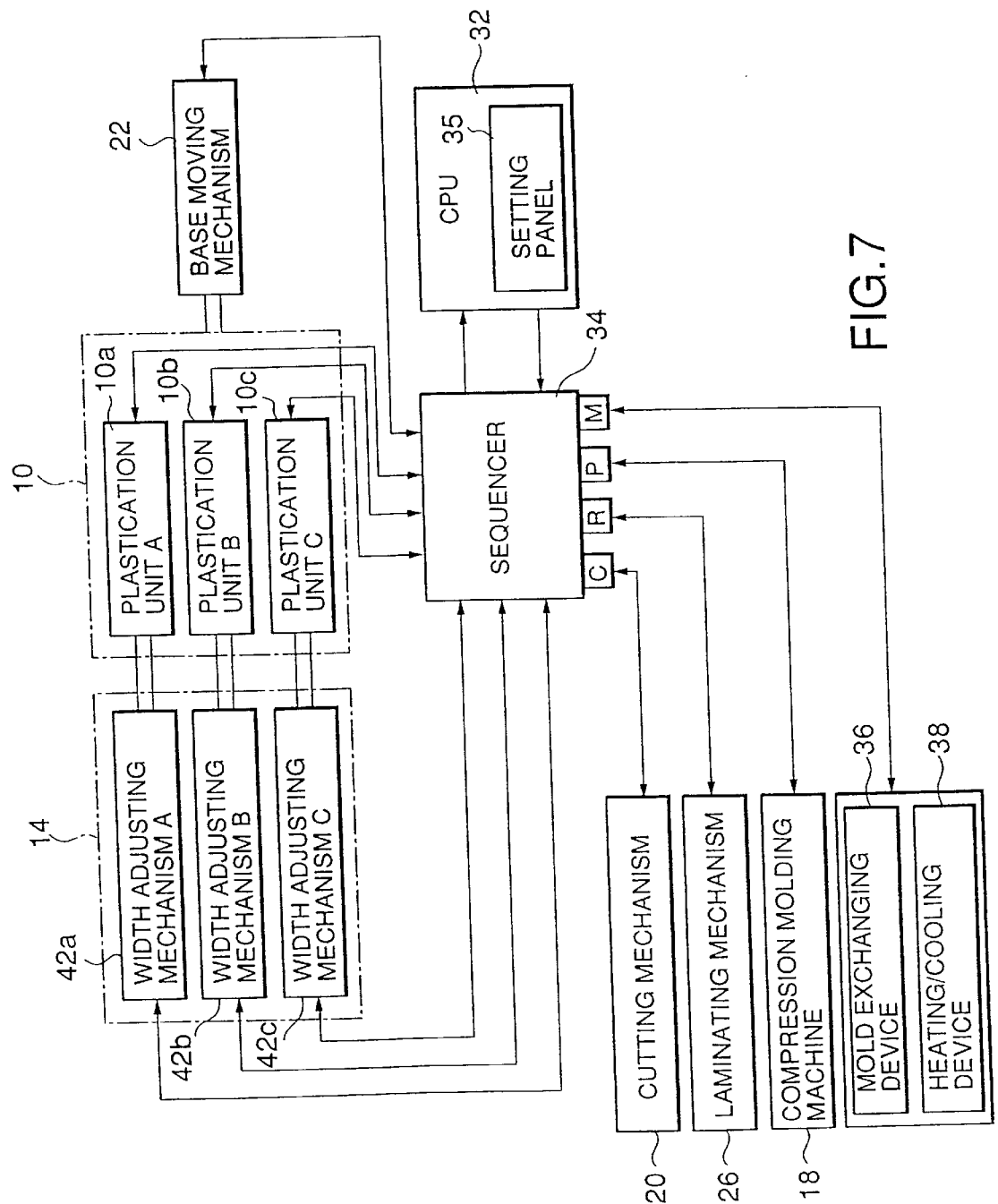
FIG. 7 is a block diagram of a sequential control system for the automatic sequential control of the molten multilayer article manufacturing apparatus in the first embodiment shown in FIG. 1.

FIG. 5 is a longitudinal sectional view showing an essential part of the multilayer article manufacturing apparatus and the arrangement of limit switches for the positioning of the multiple T die 14 and for the sequential control of operations of the component mechanisms of the apparatus. FIG. 7 is a block diagram for an automatic sequential control system.

Referring to FIG. 5, a limit switch LS includes contacts 1 to 4 disposed on the bed 17. A contact operating member 30 for operating the contacts 1 to 4 is attached to the base 19 on which the injection units 10a, 10b and 10c are mounted. The contact operating member 30 closes and opens the contacts 1 to 4 of the limit switch LS according to the position of the multiple T die 14 as the base 19 is moved. The contacts 1 to 4 of the limit switch LS correspond, respectively, to positions LS 1 to LS4 on the bottom half mold 24b of the compression molding machine 18. Signals indicating the condition of the contacts 1 to 4 of the limit switch LS are sent from the base moving mechanism 22 to a sequencer 34. Then the sequencer 34 executes a sequential control program on the basis of the input signals to control the operational sequence of the multilayer article manufacturing apparatus.

In the first embodiment, when the base 19 moves forward and the contact 1 of the limit switch LS is closed by the contact operating member 30, the slot openings of the multiple T die is located at a position directly above the position LS1 on the bottom half mold 24b. When the multiple T die 14 is moved backward, and the contact 2, 3 or 4 of the limit switch LS is closed, an end portion of the intermediate molten multilayer cut by the cutting mechanism 20 corresponds to the position LS2, LS3 or LS4. When the multiple T die 14 is at a position shown in FIG. 5, the contact 3 of the limit switch LS is closed. If the intermediate molten multilayer 16 is cut off by the cutting mechanism 20 at the moment when the contact 3 of the limit switch LS is closed, the cutting end lies at the position LS4 on the bottom half mold 24b.

In FIG. 5, indicated at 31 is an injection cylinder actuator for advancing screws 11a, 11b and 11c of the injection units 10a, 10b and 10c to deliver the molten polymer to the multiple T die 14.

FIG. 7 shows the sequential control system including the sequencer for controlling process elements of the multilayer article manufacturing apparatus. The shape patterns of each layer of the multilayer article can be specified by operating a setting panel 35. A central processing unit (CPU) 32 executes a sequential control program specifying the sequence of processes to be carried out according to the specified shape patterns, and gives instructions to the sequencer 34. Then the sequencer 34 controls operative sequences of the process elements according to the instructions given thereto.

The T dies 14a, 14b and 14c of the multiple T die 14 are provided with adjusting devices 42a, 42b and 42c, which will be described later, for adjusting the widths of the layers 16A, 16B and 16C extruded through the slot openings of the T dies 14a, 14b and 14c, respectively. The adjusting devices 42a, 42b and 42c are controlled by the sequencer 34.

The compression molding machine 18 is provided with a mold exchanging device 36 and a mold heating/cooling device 38 which are controlled by the sequencer 34.

Figure 6:
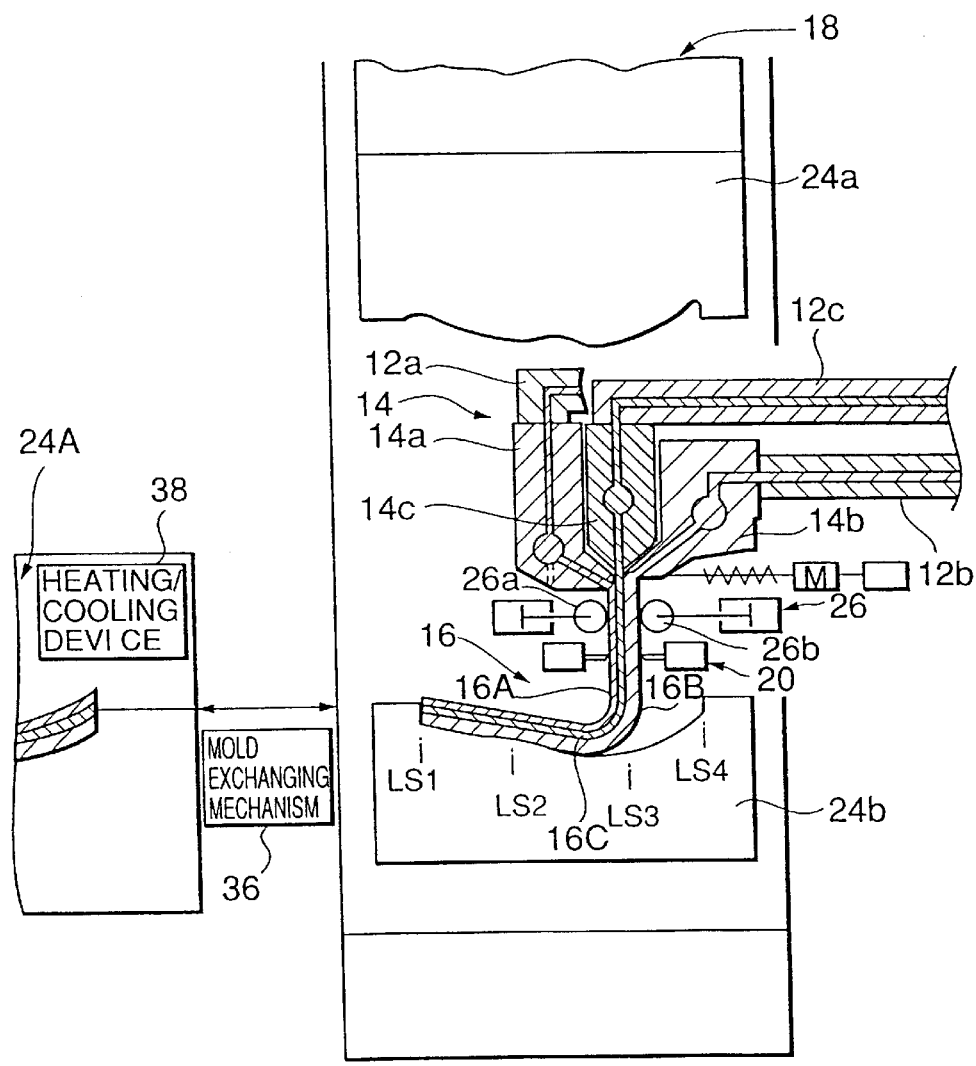
FIG. 6 is a schematic sectional view showing an intermediate multilayers obtained by cutting a multilayers and fed to the bottom half mold of the compression mold.

The operations in the multilayer article manufacture will be described hereinafter with reference to FIGS. 5 to 7.

Referring to FIG. 5, the screws 11a, 11b and 11c of the injection units 10a, 10b and 10c of the plastication means 10 are advanced to force the molten polymer through the delivery nozzles 12a, 12b and 12c into the T dies 14a, 14b and 14c of the multiple T die 14. The molten polymer is formed into the molten monolayers 16A, 16B and 16C by extrusion through the T dies 14a, 14b and 14c.

The multiple T die 14 continues to extrude the monolayer 16A, 16B and 16C, while the injection unit 10a, 10b and 10c together with the base 19 is advanced to move the multiple T die 14 into the space between the open top half mold 24a and the bottom half mold 24b. The monolayers 16A, 16B and 16C are superposed and laminated between the nip rollers 26a and 26b disposed below the multiple T die 14 to form the intermediate molten multilayer 16.

The multiple T die 14 is advanced further into the space between the top half mold 24a and the bottom half mold 24b, until the multiple T die 14 arrives at the position directly above the position LS1 where contact 1 of the limit switch LS is switched on. Consequently, the end portion of the intermediate molten multilayer 16 hanging from the multiple T die 14 falls upon the position LS1 on the bottom half mold 24b.

The sequencer 34 gives an instruction to the base moving mechanism 22 to retreat the multiple T die 14. While retreating, the intermediate molten multilayer 16 is extruded continuously through the multiple T die 14 so as to be placed onto the bottom half mold 24b.

Upon the arrival of the multiple T die 14 at a position directly above the position LS3 (FIG. 5), the contact 4 of the limit switch LS is switched on and an on-signal is given to the sequencer 34. The sequencer 34 actuates the cutting mechanism 20 to cut off the intermediate molten multilayer 16 to a predetermined length. When the cut end portion of the intermediate molten multilayer 16 is placed onto the position LS4, the delivery of the intermediate molten multilayer 16 to the bottom half mold 24b is completed.

Thus, the laminating process of the monolayers 16A, 16B and 16C extruded through the multiple T die 14 and the delivery of the intermediate molten multilayer 16 to the bottom half mold 24b is accomplished with one motion of the base moving mechanism 22.

Since the monolayers 16A, 16B and 16C in molten state are superposed and cut, the cut edges of the monolayers 16A, 16B and 16C can be welded together. Therefore, the end portion of the intermediate molten multilayer 16 can be easily set on the bottom half mold 24b for the next compression molding cycle, and the yield rate can be improved.

In a compression molding process, namely, the last process, the top half mold 24a is lowered to compress the intermediate molten multilayer 16 between the top half mold 24a and the bottom half mold 24b to form it into the desired shape as a multilayer article.

Figure 4:
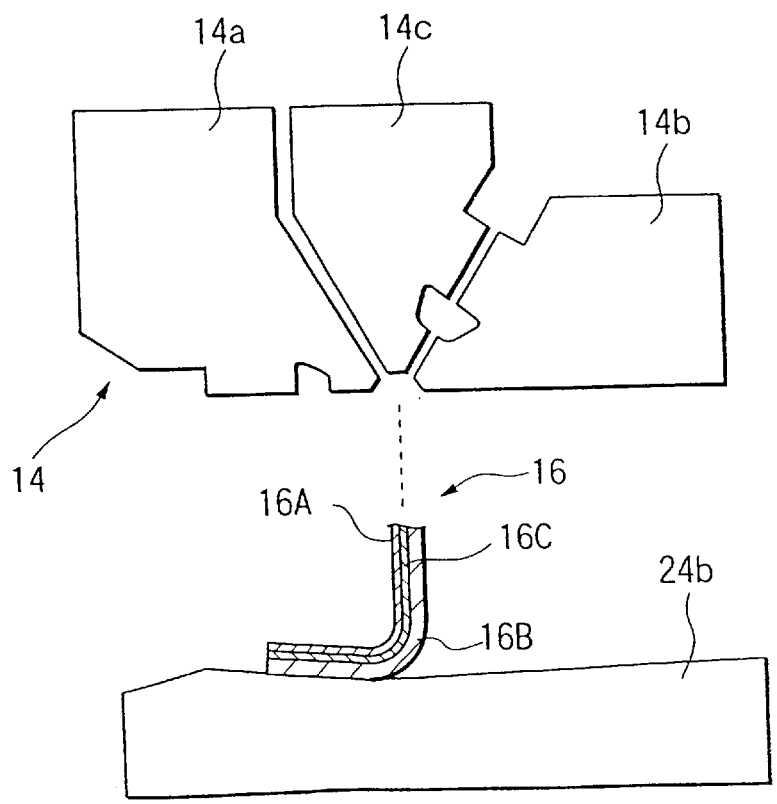
FIG. 4 is a schematic view, similar to FIG. 3, of assistance in explaining a mode of feeding multilayers extruded through the multiple T die of FIG. 3 to a bottom half mold of a compression mold of a compression molding machine.

It is preferable to assemble the T dies 14a, 14b and 14c so that the intermediate molten multilayer 16 with the thickest or heaviest monolayer 16B as a lower most layer is delivered to the bottom half mold 24b as shown in FIG. 4. When the T dies 14a, 14b and 14c are assembled so as to meet the foregoing requirement, it is preferable to dispose the T die 14b, connected to the injection unit 10b, so that the delivery nozzle 12b is the shortest among the delivery nozzles 12a, 12b and 12c, as shown in FIG. 2, to force the molten polymer into the T die 14b at a low pressure loss and to save space.

2. Structural Patterns of Multilayer Articles

Multilayer articles of various shapes that can be manufactured by the present invention will be described with reference to FIGS. 8(a) to 8(e).

Structure 1

Figure 8:
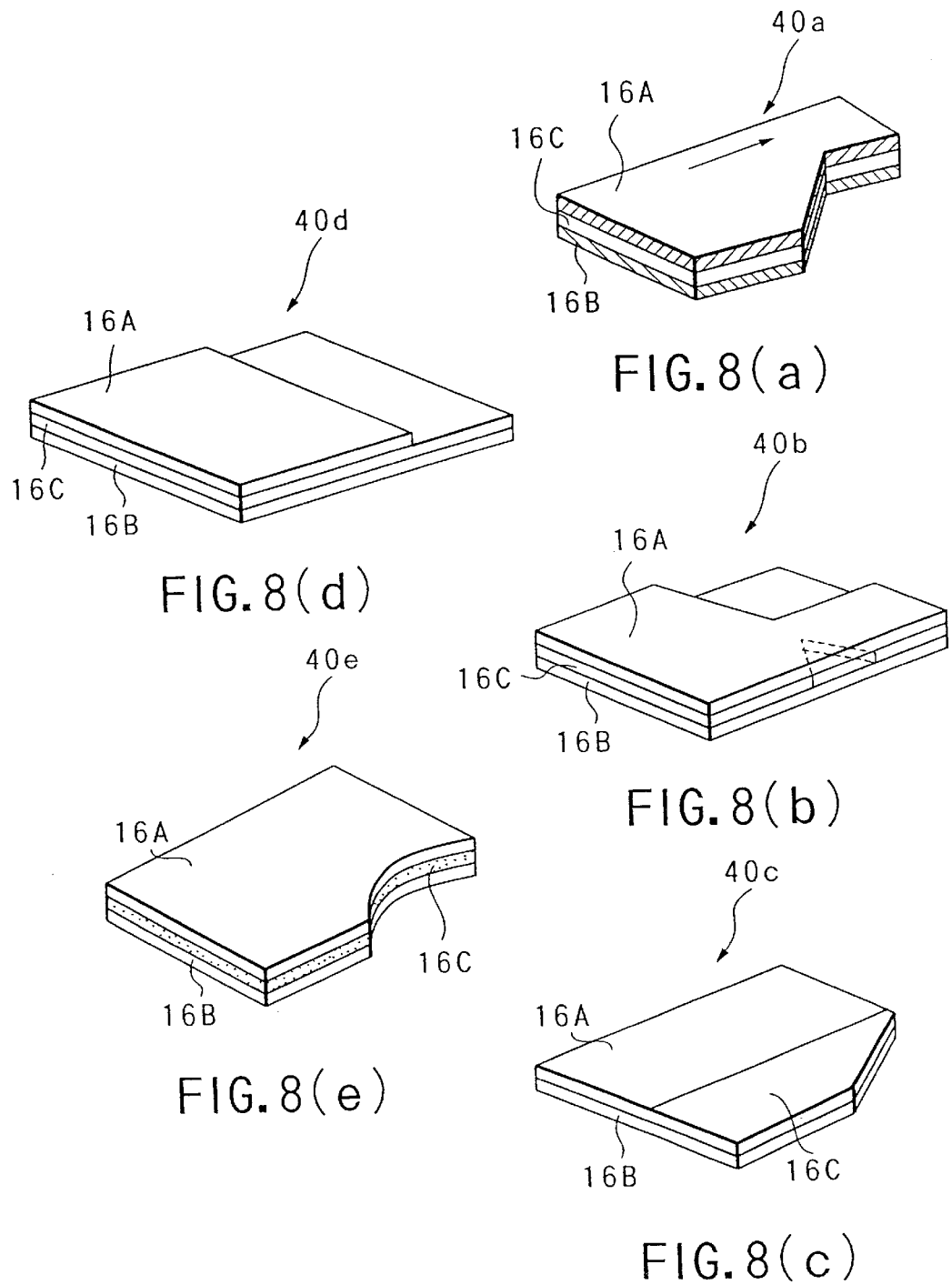
FIGS. 8(a) to 8(e) are perspective views of molded multilayer article of different shapes manufactured by the first embodiment shown in FIG. 1.

A multilayer article 40a shown in FIG. 8(a) is a three layer structure consisting of a first monolayer 16A serving as a skin layer, a second monolayer 16B serving as a base layer, and a third monolayer 16C serving as an mid-layer, and the monolayers 16A, 16B and 16C have the same shape and made of the same thermoplastic polymer, such as a polyolefin.

Structure 2

A multilayer article 40b shown in FIG. 8(b) is a three layer structure consisting of monolayers 16A, 16B and 16C respectively having different shapes. The monolayers 16A, 16B and 16C have different shapes in respect of the width pattern, respectively. The adjusting devices 42a, 42b and 42c included in the T dies 14a, 14b and 14c are controlled so as to vary the widths of the monolayers 16A, 16B and 16C according to the patterns as shown in FIG. 8(b) to form the multilayer article 40b having layers in different width patterns.

Structure 3

A multilayer article 40c is a two layer structure consisting of monolayers 16A and 16C serving as a surface layer, and a monolayer 16B serving as a base layer. The monolayers 16A and 16C have a different color or made of a material different from each other.

Structure 4

A multilayer article 40d shown in FIG. 8(d) is a three layer structure consisting of a monolayer 16A serving as a skin layer, a monolayer 16B serving as a base layer, and a monolayer 16C serving as a mid-layer. The length of the monolayer 16A is shorter than those of the monolayer 16B and 16C. While laminating the monolayers 16A, 16B and 16C, only the monolayer 16A is cut to a predetermined shorter length by the cutting mechanism 20, and the feed of the molten polymer by the injection unit 10a to the T die 14a through which extrudes the monolayer 16A is suspended. This process enables to form the multilayer article 40d partly varying in the number of layers easily.

Structure 5

A multilayer article 40e shown in FIG. 8(e) is a three layer structure consisting of a monolayer 16A serving as a skin layer, a monolayer 16B serving as a base layer, and a monolayer 16C serving as a mid-layer made of a foaming polymer. The monolayers 16A, 16B and 16C have the same shape.

The polymer material used for forming the mid-layer 16C contains a foaming agent. The injection unit 10c plasticates the polymer material at a relatively lower temperature which does not cause the foaming agent to generate a gas, and then feeds the polymer material to the T die 14c. The temperatures of the molten polymer forming the skin layer 16A and the base layer 16B are higher than that of the molten polymer for the mid-layer 16C by temperatures in the range of 50 to 100° C.

As is obvious from FIGS. 3 and 4, the multiple T die 14 is not an integrated die which is composed of the T dies 14a, 14b and 14c, but an assembly of the component T dies 14a, 14b and 14c. Therefore, the T die 14c interposed between the T dies 14a and 14b is safe from heat conduction due to the direct contact, and the temperatures of the T dies 14a, 14b and 14c can be independently controlled. Since the molten polymers extruded through the T dies 14a, 14b and 14c are laminated outside below the multiple T die 14, the temperature of the molten polymer extruded through the T die 14c can be maintained at a relatively low temperature that will not cause the foaming agent to generate a gas. Therefore, the intermediate molten multilayer 16 is fed to the compression molding machine 18 in a state where the molten layer 16C is kept unfoamed.

As shown in FIG. 5, the intermediate molten multilayer 16 is compressed between the top half mold 24a and the bottom half mold 24b to mold it into the desired shape for the finished part. The clamped mold is detached from the compression molding machine 18 and replaced with another mold by the mold exchanging device 36. The detached mold is heated by the heating/cooling unit 38 at a predetermined temperature where the layer 16C foams.

Preferably, the mold exchanging device 36 replaces a mold 24A in which the molten layer 16C is foaming with an empty mold, because foaming process take sufficient time. By that means, the mold 24A can be kept in the foaming process sufficient to foam the layer 16C satisfactorily. After the completion of foaming of the layer 16C, the mold 24A is cooled before the multilayer article 40e is ejected from the mold 24A. Thus, the mid-layer 16C is kept unfoamed while the molten layers 16A, 16B and 16C are laminated. And the layer 16C is made to foam during the compression molding process to improve the moldability with an excellent aesthetic appearance.

Furthermore, the mold exchanging device 36 enable the compression molding machine 18 to start the next molding cycle immediately, so that the multilayer article 40e can be manufactured efficiently.

3. Automatic Width Control Operation for the Width Adjusting Mechanisms in the T Dies The automatic control for the width adjusting mechanisms 42a, 42b and 42c to manufacture the multilayer article in various shapes will be described hereinafter.

FIG. 9 shows the width adjusting mechanism 42a disposed in the T die 14a. The width adjusting mechanism 42b and 42c disposed respectively in the T dies 14b and 14c are the same as the width adjusting mechanism 42a shown in FIG. 9 and hence only the width adjusting mechanism 42a will be described.

Referring to FIG. 9, a pair of deckles 52a and 52b are fitted into a slot opening 50 of the T die 14a so as to be movable in the transverse direction of the molten layer being extruded through the T die 14a. The deckles 52a and 52b are moved simultaneously toward or away from each other to adjust the length of the slot opening 50.

Each of the deckles 52a and 52b is driven by a deckle moving mechanism provided with a servomotor 54. Only the deckle moving mechanism and the servomotor 54 for moving the deckle 52b is shown in FIG. 9. A drive shaft of the servomotor 54 is coupled to a ball screw 58 by a shaft coupling 56. A slider 60 provided with a ball nut is connected to one end of the deckle 52b and is supported slidably on guide rods 62a and 62b. The ball screw 58 is engaged with the ball nut included in the slider 60. The servomotor 54 drives the ball screw 58 for rotation to move the slider 60 along the guide rods 62a and 62b, so that the deckle 52b is moved linearly along the slot opening 50 of the T die 14a.

The positions and velocity of the deckles 52a and 52b can be controlled by controlling the servomotors 54. While the molten polymer is being extruded through the slot opening 50, the deckles 52a and 52b are held at a predetermined position to shape the molten polymer into the molten layer in a desirable width. Continuous control of the positions of the deckles 52a and 52b while extrusion through the slot opening 50 makes it possible to vary the molten layer in width continuously.

Methods of controlling the positions and velocity of the decides 52a and 52b will be described below.

Open-Loop Control Method

Figure 10:
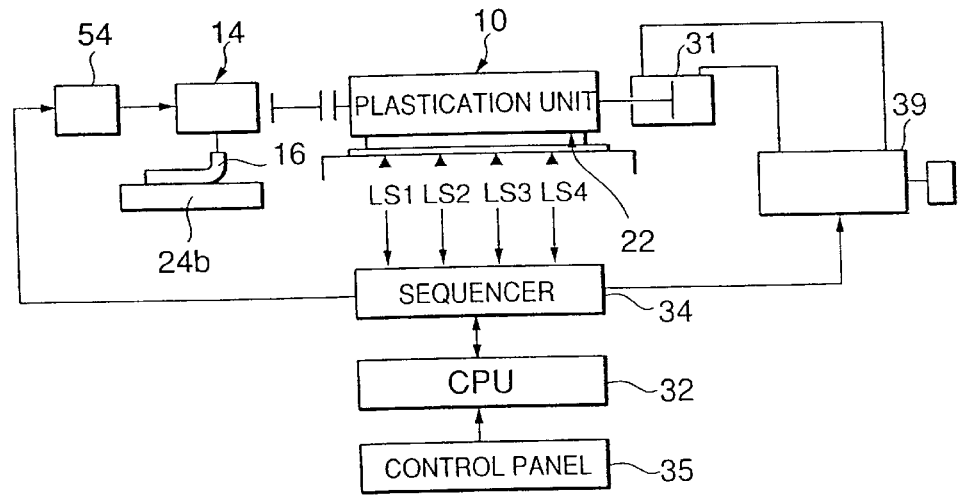
FIG. 10 is a block diagram of an open-loop control system included in the molded multilayer article manufacturing apparatus in the first embodiment shown in FIG. 1.

FIG. 10 shows an open-loop control system for the positional control of the deckles to form the multilayer article in the shapes shown in FIGS. 8(a) to 8(e).

As mentioned above with reference to FIG. 5, the respective positions of the injection molding machine 10 (injection units 10a, 10b and 10c) and the multiple T die 14 (T dies 14a, 14b and 14c) are detected by any one of the contacts 1 to 4 of the limit switch LS, and the sequencer 34 controls operation for extruding the molten polymers according to the position of the multiple T die 14.

The CPU 32 produces instructions to be given to the sequencer 34 on the basis of the data set by a setting panel 35 regarding to the shape of the multilayer article. The sequencer 34 gives position (velocity) instructions to the servomotors 54 for the open-loop control of the positions (velocity) of the deckles 52a and 52b.

The sequencer 34 controls a flow regulating solenoid valve 39 to regulate the flow rate of a hydraulic fluid supplied to the injection cylinder 31. The injection cylinder 31 makes the screws 11a, 11b and 11c move forward at a predetermined speed to feed the molten polymer at a predetermined delivery rate. By controlling the delivery rate to be substantially proportional to the change rates at which the widths of the molten layers are changed by the control of the positions (speeds) of the decides 52a and 52b, only the width of the molten layers each extruded through the T dies 14a, 14b and 14c can be controlled with the molten layers kept in a constant thickness.

In an embodiment in which extruders for continuous extrusion as the plastication means are employed instead of the injection unit 10, the rotating rate of the screws of the extruders are controlled to vary the delivery rates of the molten polymer.

Closed-Loop Control Method

Figure 11:
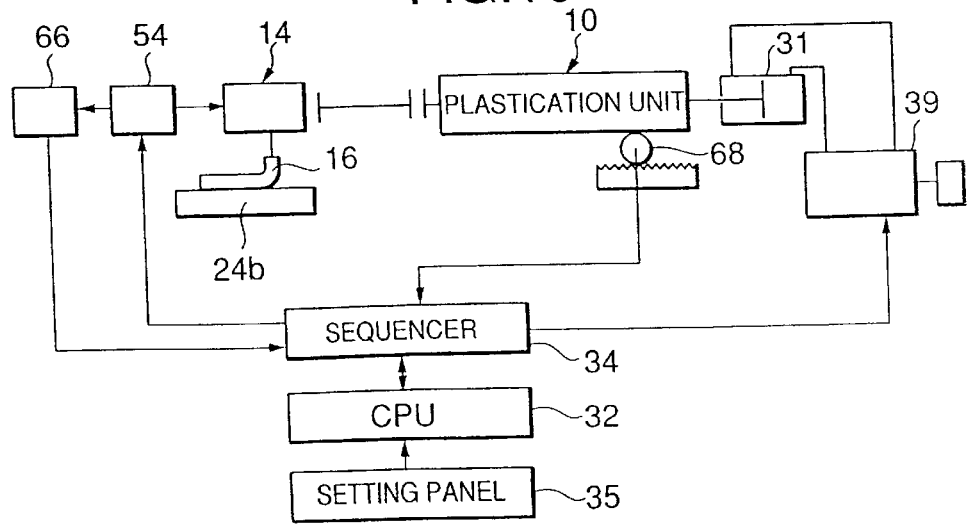
FIG. 11 is a block diagram of a closed-loop control system included in the molded multilayer article manufacturing apparatus in the first embodiment shown in FIG. 1.

FIG. 11 shows a closed-loop control system for the positional control of the deckles to form the multilayer article in the shapes shown in FIGS. 8(a) to 8(e).

Program data for varying the widths of the molten layers according to the shape of a multilayer article is prepared by using the setting panel 35. The CPU 32 gives position instruction signal of the deckles 52a and 52b in accordance with the shape of the part through the sequencer 34 to the servomotors 54. Consequently the positions (velocities) of the deckles 52a, 52b fitted in the T dies 14a, 14b and 14c respectively can be continuously adjusted to vary the respective widths of the molten layers during the extrusion.

The positions and the velocities of the decides 52a and 52b are detected by encoders 66 connected to the servomotors 54, and the encoders 66 feed back the detection signals to the sequencer 34 for a feedback control operation. Sensors 68 which detect the positions and the velocities of the screws of the injection units 10a, 10b and 10c feed back signals to the sequencer 34 for a feedback control operation. The detected positions (velocities) of the deckles 52a and 52b represented by the feedback signals are compared with the instructed positions (velocities) in order to make the deckles 52a and 52b follow to the instructions. And the sequencer 34 compares the detected positions (velocities) of the screws 11a, 11b and 11c with the instructions to control the flow rate of the hydraulic fluid supplied through the flow regulating valve 39 to the injection cylinder 31. Thus, the delivery rates at which the molten polymers are delivered by the injection units 10a, 10b and 10c are successively controlled.

In an embodiment in which extruders for continuous extrusion as the plastication means are employed instead of the injection unit 10, the rotating rate of the screws of the extruders are controlled to vary the delivery rates of the molten polymer.

4. Example of Sequential Control Program for Multilayer Article Manufacturing

Figure 12:
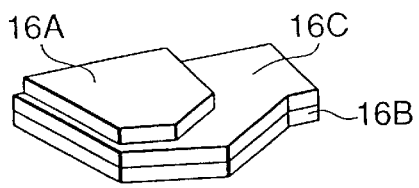
FIG. 12(a) is a sectional view of the multilayer article.
FIGS. 12(b), 12(c), and 12(d) are time charts of assistance in explaining the sequential operations of mechanisms included in the molded multilayer article manufacturing apparatus in the first embodiment shown in FIG. 1.
Figure 12:
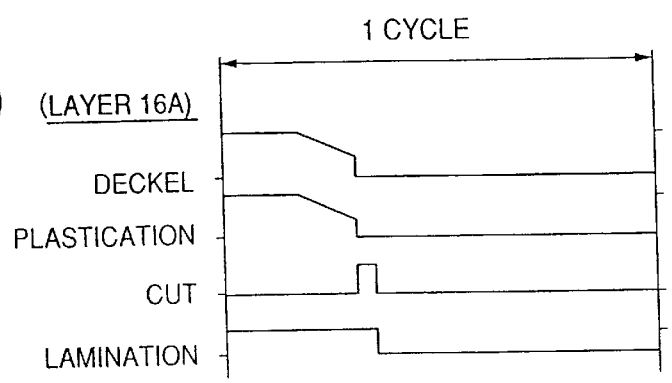
Figure 12:
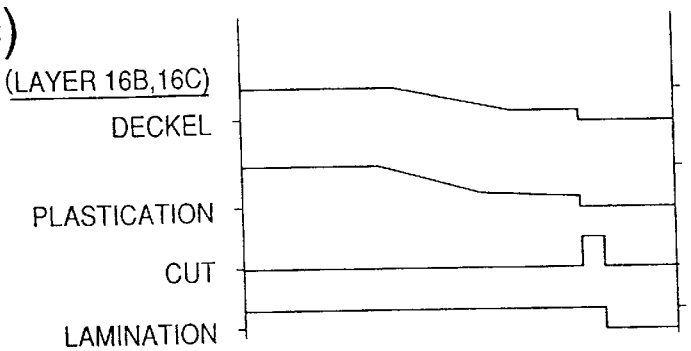
Figure 12:
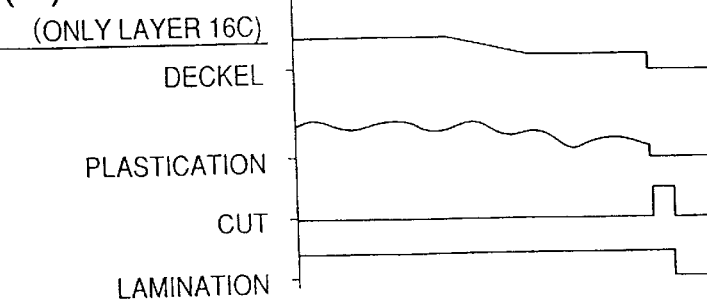

A sequential control program for the automatic manufacture of the multilayer article will be described by way of example with reference to FIG. 12.

FIGS. 12(b), 12(c) and 12(d) are time sharing charts of a sequential control program for a multilayer article shown in FIG. 12(a), showing a series of operations for the deckles 52a and 52b, the injection units 10a, 10b and 10c, the cutting mechanism 20 and the laminating mechanism 26. In this example, the multilayer article consists of monolayers 16A, 16B and 16C.

FIG. 12(b) shows a time sharing chart for the monolayer 16A shortest in length. The position (velocity) of the deckles 52a, 52b, the plastication operation of the injection unit 10a, the cutting operation of the cutting mechanism 20, and the laminating operations of the laminating mechanism 26 in one fabrication cycle are controlled to follow in the series of sequences given in the time sharing chart in FIG. 12(b).

FIG. 12(c) shows a time sharing chart for the monolayers 16B and 16C of the same length. The position (velocity) of the deckles 52a, 52b, the plastication operations of the injection unit 10b and 10c, the cutting operation of the cutting mechanism 20, and the laminating operations of the laminating mechanism 26 in one fabrication cycle are controlled to follow in the series of sequences given the time sharing chart in FIG. 12(c).

Since the monolayer 16A is shorter than the monolayers 16B and 16C in length, the operational sequences of the injection unit 10a and the deckles 52a, 52b are determined so that the extrusion of the monolayer 16A is scheduled to suspend during the continuous extrusion of the monolayers 16B and 16C. While the monolayers 16A, 16B and 16C are laminated together, the layer 16A exclusive of layers 16B and 16C is cut off to a predetermined length upon the suspension of the extrusion thereof. As for the rest layers, the monolayers 16B and 16C are extruded continuously up to the completion of extrusion when the monolayers 16B and 16C are cut off to a predetermined length longer that that of the layers 16A.

It is noted that the monolayers 16A, 16B and 16C which are uniform in thickness are formed during the extrusion. For that purpose, the decrease rates of the feed of the molten polymer from the injection units 10a, 10b and 10c correspond to the reducing rates at which the deckles 52a and 52b regulate the slot opening lengths of the T dies 14a, 14b and 14c to narrow the monolayers 16A, 16B and 16C.

FIG. 12(d) shows a time sharing chart for the multilayer article of which the monolayer 16C is not uniform in thickness. The delivery rate at which the injection unit 10c delivers the molten polymer to extrude the layer 16C is regulated in a manner as shown in FIG. 12(d).

5. Modifications of the Cutting Mechanism

Modifications of the cutting mechanism will be described hereinafter.

Cutting Mechanism in First Modification

Figure 13:
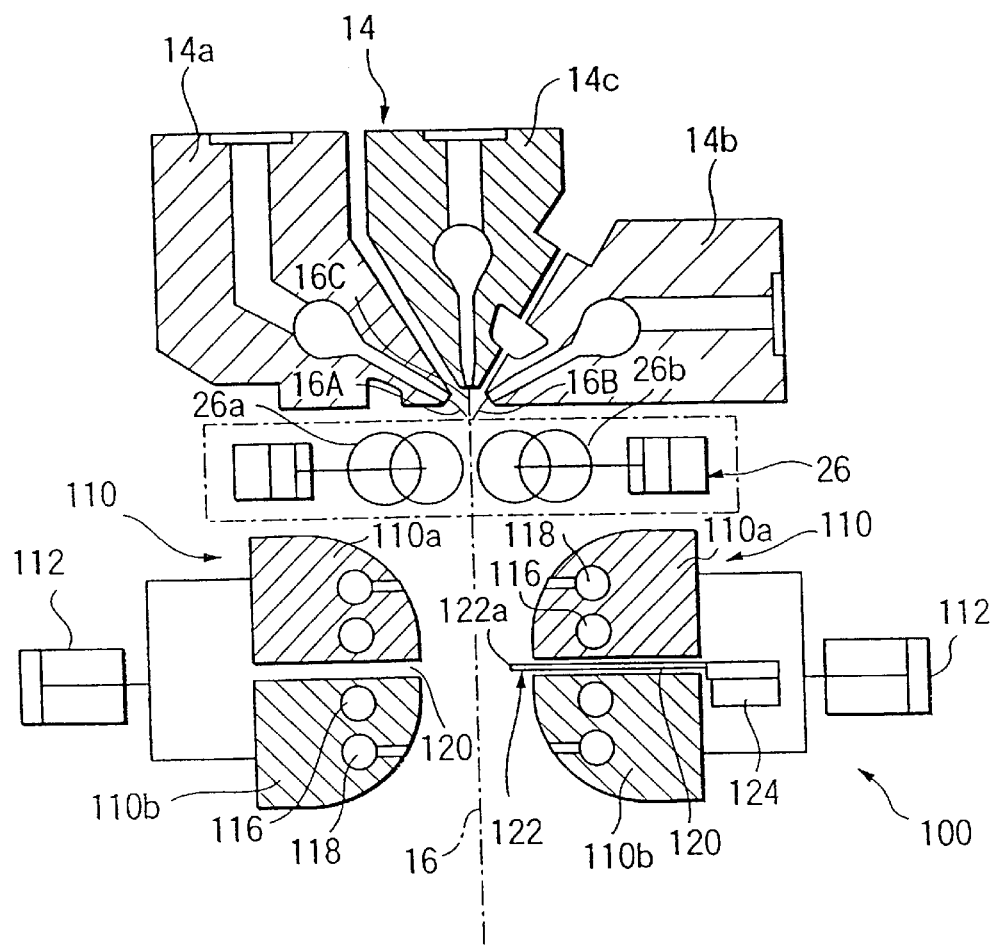
FIG. 13 is a schematic sectional view of a sheet cutting mechanism included in the molded multilayer article manufacturing apparatus in the first embodiment shown in FIG. 1.
Figure 14:
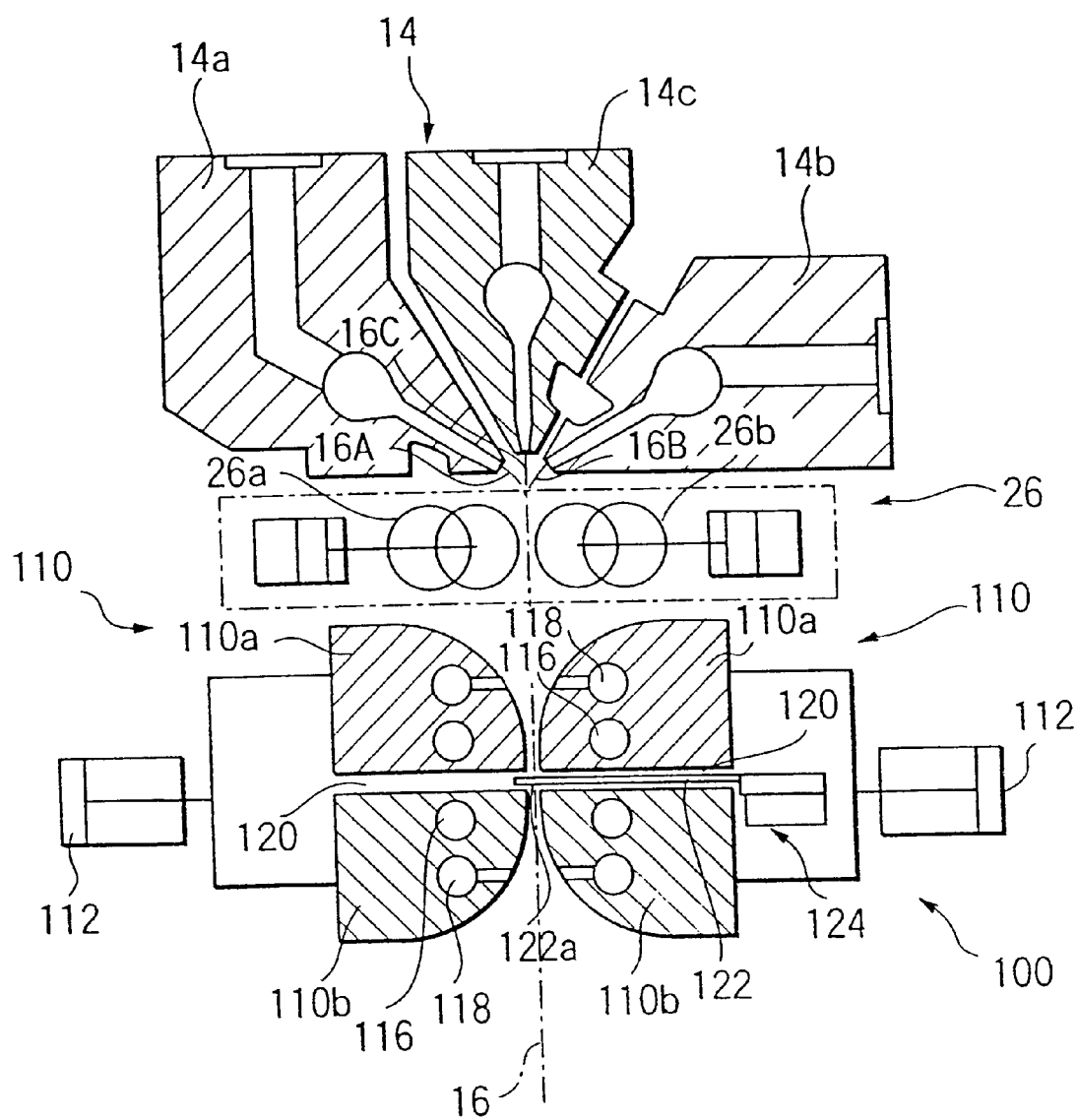
FIG. 14 is a schematic sectional view of the sheet cutting mechanism of FIG. 13 in a cutting operation.

FIG. 13 shows a cutting mechanism 100 for cutting the intermediate molten layer to provide an given length, and FIG. 14 shows the cutting mechanism 100 in operation.

The cutting mechanism 100 is disposed downstream of the laminating mechanism 26 with respect to a feed direction. The cutting mechanism 100 is provided with a pair of pad members 110 disposed opposite to each other to press the intermediate molten multilayer 16 therebetween. An opposite end surface of each pad member 110 has a spherical surface adaptable for introducing the intermediate molten multilayer 16 in contact with it. In this embodiment, each pad member 110 is divided into a pair of half pads 110a and 110b disposed one over the other symmetrically with a narrow space 120 formed therebetween. The pad members 110 each comprising the half pads 110a and 110b are connected to driving devices 112, such as a hydraulic cylinder.

Preferably, the spherical surfaces of the pad members 110 to be brought into contact with the intermediate molten multilayer 16 are coated with anti-adhesive coatings, respectively, to prevent the molten polymer from adhering to the surfaces of the pad members 110. Passages 116 as a cooling means through which a coolant is circulated are provided in the body of the pad members 110 to cool the heated portion of the pad members 110 in contact with the intermediate molten multilayer 16.

The pad members 110 are provided with air passages 118, as an air blowing means, open into the spherical surfaces thereof to blow compressed air toward the surface of the intermediate molten multilayer 16 in order to facilitate the removal from the surfaces of the pad members 110. The space 120 is confined between the opposite walls of the half pads 110a and 110b. The spherical surfaces of the half pads 110a and 110b are formed so as to protrude toward the intermediate molten multilayer 16, and the space 120 is located between the walls which intersect the top contact surface of the half pads 110a and 110b. Either of the pad members 110 is provided with a cutting blade 122 disposed in the space 120 between the half pads 110a, and the cutting blade can stick out from the spherical surface of the half pads toward the intermediate multilayer 16. The cutting blade 122 has a cutting edge 122a and is positioned so that the cutting edge 122a projects slightly from the spherical surfaces of the half pads 110a and 110b. The cutting blade 122 is connected to a cutter running device 124 which moves the cutting blade 122 in the transverse direction of the intermediate molten multilayer 16 to cut it of to a given length.

Figure 15:
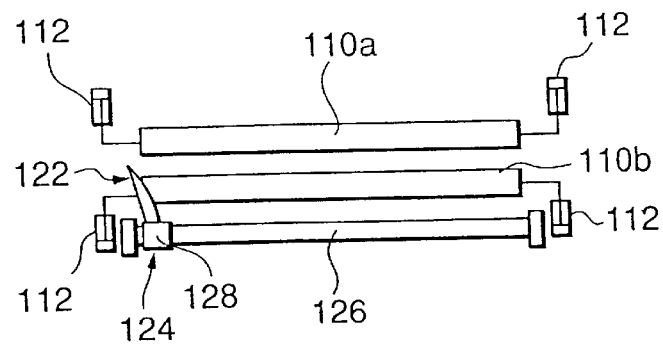
FIG. 15 is a schematic side view of assistance in explaining the arrangement of the sheet cutting mechanism of FIG. 13.

FIG. 15 shows the cutter running device 124 in more detail. The cutting blade 122 is attached to a linear actuator 128 which moves slidably on a guide bar 126 disposed parallel to the transverse direction of the intermediate molten multilayer 16.

The function of the cutting mechanism 100 will be described below.

While the molten monolayers 16A, 16B and 16C are extruded through the T dies 14a, 14b and 14c of the multiple T die 14, the nip rollers 26a and 26b of the laminating mechanism 26 laminate them together to form the intermediate molten multilayer 16 by nipping the monolayers 16A, 16B and 16C therebetween. The laminated multilayer 16 travels downwardly through the space between the pad members 110 of the cutting mechanism 100.

When the actuators 112 are actuated to advance the pad members 110, the intermediate molten multilayer 16 is held between the pad members 110 at a position of 30 to 100 mm below the slot openings of the T dies 14a, 14b and 14c as shown in FIG. 14.

Figure 16:
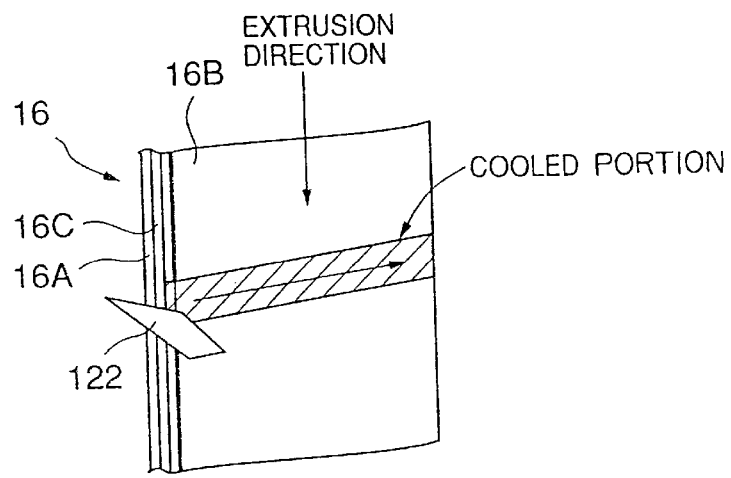
FIG. 16 is a perspective view of assistance in explaining a sheet cutting operation of a cutting blade included in the sheet cutting mechanism of FIG. 13.

Although the intermediate molten multilayer 16 is in the molten or semi-molten state as a whole, a small portion thereof in contact with the pad member 110 may be cooled by the cooling effect of the coolant flowing through the passages 116. A shaded part shown in FIG. 16 is the cooled portion of the intermediate molten multilayer 16. The cutting blade 122 is disposed so as to be opposite closely to the cooled portion of the intermediate molten multilayer 16. When the cooled portion of the intermediate molten multilayer 16 is solidified into a state sufficient to cut it off easely, the cutter running device 124 commences movement of the cutting blade. Consequently, the cutting blade 122, which has been on standby, travels transversely to cut off the intermediate molten multilayer 16 to a predetermined length.

According to the cutting mechanism 100, only the cooled portion of the intermediate molten multilayer 16, including a cutting line, is cooled to semi-solid stated so that the cooled portion 16 can be easily cut along the cutting line. Therefore, the intermediate molten multilayer 16 can be quickly and smoothly cut without remaining the adhesion of the molten polymer to the cutting edge 122a of the cutting blade 122. As the cut edges of the monolayers 16A, 16B and 16C can be securely adhered to each other, the leading edge of the intermediate molten multilayer 16 can be easily set on the molds for the next compression molding cycle.

During the cutting process, the molten intermediate multilayer 16 is cut with the cutting blade 122 while the same is pressed between the presser pads 110, so that air may not enter into clearances between the laminated monolayers 16A, 16B and 16C.

When retracting the pad member 110 by the driving actuator 112 after the intermediate molten multilayer 16 has been cut, compressed air is jetted through the air passages 118 against the intermediate molten multilayer 16. Air blowing at the start of retraction of the pad member 110 enables the intermediate molten multilayer 16 to peel off from the surfaces of the pad member 110. Therefore, it is possible to avoid the firm adhesion of the intermediate molten multilayer 16 to the surfaces of the pad member 110.

As for a shape of the half pads 110a and 110b of the pad member 110 having cooling capability of the cutting mechanism 100, a pair of half pads which has a shape of a roller may be used.

Figure 17:
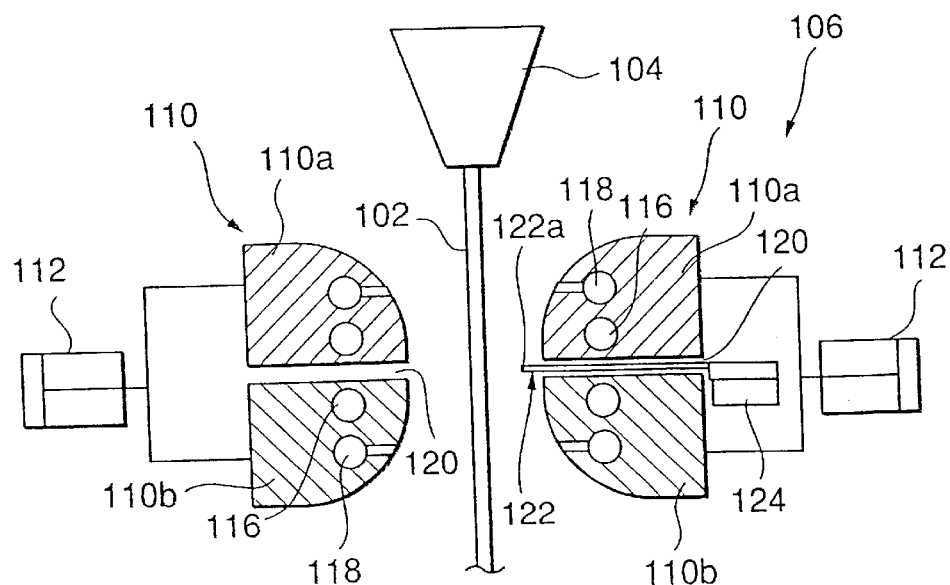
FIG. 17 is a schematic sectional view of a sheet cutting mechanism for cutting a monolayer.

FIG. 17 shows a cutting mechanism 106 which is applied to cutting a monolayer 102.

As shown in FIG. 17, the monolayer 102 extruded through a T die 104 is cut by the cutting mechanism 106. Thus, the monolayer 102 can be easily and smoothly cut by the cutting mechanism 106 of the same construction as the cutting mechanism 100 of FIG. 13.

Cutting Mechanism in Second Modification

Figure 18:
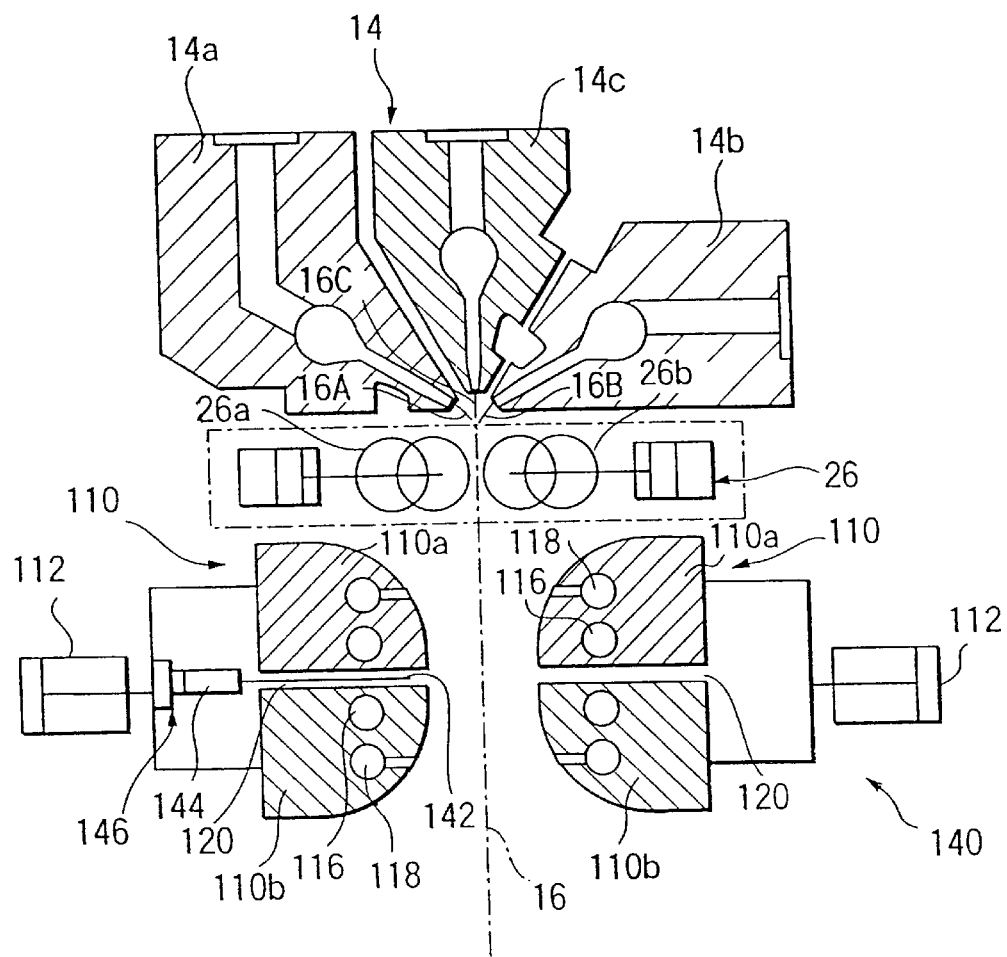
FIG. 18 is a schematic sectional view of a sheet cutting mechanism included in a molded multilayer article manufacturing apparatus in a second embodiment according to the present invention.
Figure 19:
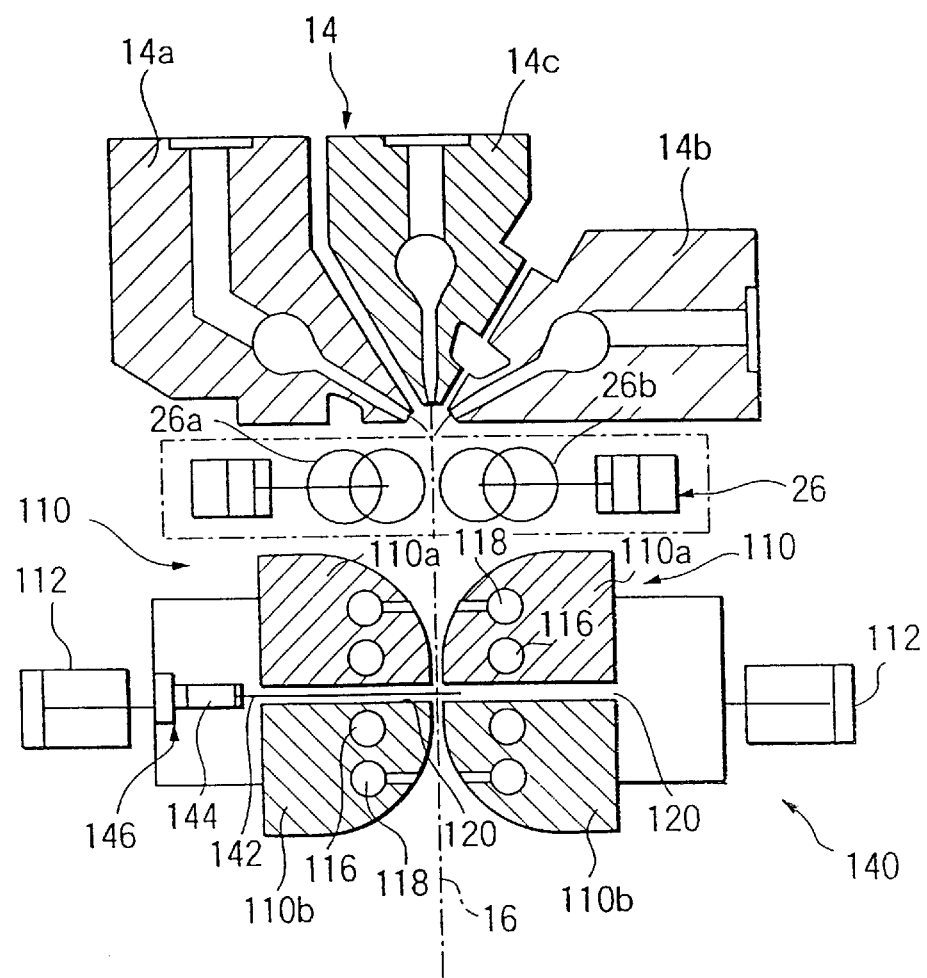
FIG. 19 is a schematic sectional view of the sheet cutting mechanism of FIG. 18 in a cutting operation.

FIGS. 18 and 19 show a second modification of the cutting mechanism 100 of FIG. 13. A cutting mechanism 140 is provided with a pair of pad members 110 which ate the same as those of FIG. 13. The intermediate molten multilayer 16 is held between the pad members 110 when the same is cut. In FIGS. 18 and 19, parts like or corresponding to those of the cutting mechanism 100 of FIG. 13 are designated by the same reference characters and the description thereof will be omitted.

Figure 20:
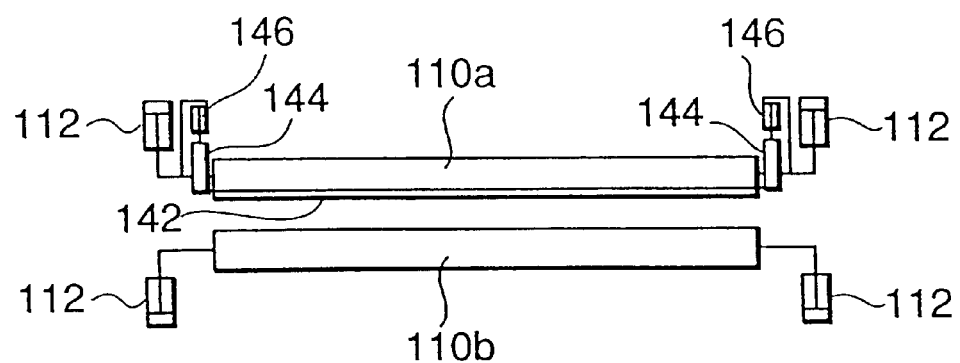
FIG. 20 is a schematic plan view of assistance in explaining the arrangement of the sheet cutting mechanism of FIG. 18.

In the cutting mechanism 140, a metal thin plate 142 for use as a cutting blade is disposed in the space 120 between the half pads 110a and 110b of one of the pad members 110. The metal thin plate 142 has a length greater than the width of the intermediate molten multilayer 16. The metal thin plate 142 is held in the space 120 so as to be projected from the surface of the pad member 110 which is brought into contact with the intermediate molten multilayer 16. As shown in FIG. 20, the metal thin plate 142 is held at its opposite ends on holding members 144 which are connected to actuators 146 (cutter operating means), such as hydraulic cylinders. The actuators 146 advance the metal thin plate 142 in the space 120 toward the intermediate molten multilayer 16 so that the cutting edge of the metal thin plate 142 projects from the surface of the pad member 110.

A metal wire, such as a piano wire, may be used instead of the metal thin plate 142 for cutting the intermediate molten multilayer 16. The intermediate molten multilayer 16 can be easily cut with the metal thin plate 142 or a metal wire being heated by a heater built in the pad member 110. It is effective to use, as the metal wire, a nichrome wire or the like which generates heat when electric power is applied.

The operation of the cutting mechanism 140 will be described below. When the monolayers 16A, 16B and 16C are extruded through the T dies 14a, 14b and 14c of the multiple T die 14, the monolayers 16A, 16B and 16C are laminated between the nip rollers 26a and 26b of the laminating mechanism 26 to form the intermediate molten multilayer 16. The intermediate molten multilayer 16 travels through the space between the pad members 110 of the cutting mechanism 140.

The intermediate molten multilayer 16 is held between the pad members 110 at a position about 30 to 100 mm below the die openings of the multiple T die 14 as shown in FIG. 19.

Figure 21:
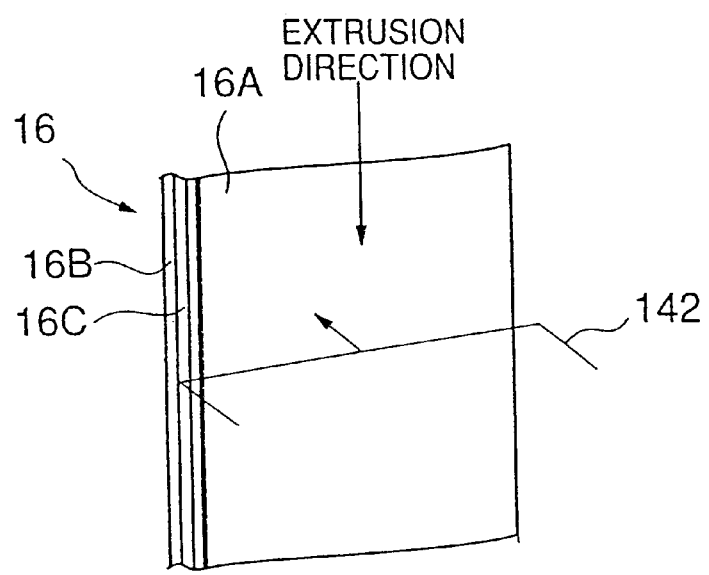
FIG. 21 is a perspective view of assistance in explaining a sheet cutting operation of a cutting blade included in the sheet cutting mechanism of FIG. 18.

Then, the actuators 146 are actuated to advance the metal thin plate 142 which is kept opposite to a surface of the intermediate molten multilayer 16. The metal thin plate 142 is pressed against the intermediate molten multilayer 16 as shown in FIG. 21 to cut it to length by shearing.

During the cutting operation of the cutting mechanism 140, the intermediate molten multilayer 16 is held between the pad members 110 so that air may not be trapped between the laminated molten monolayers 16A, 16B and 16C.

The intermediate molten multilayer 16 can be more easily cut by using the heated metal thin plate 142 which is pressed against the intermediate molten multilayer 16.

The actuators 146 retracts the metal thin plate 142 on completion of cutting operation, and the driving devices 112 retracts the pad members 110. When retracting the pad members 110, compressed air is jetted through the air passages 118 against the intermediate molten multilayer 16. Air blowing at the start of retraction of the pad members enables the intermediate molten multilayer 16 to peel off from the surface of the pad members 110. Therefore, it is possible to avoid the firm adhesion of the intermediate molten multilayer 16 to the surfaces of the pad members 110.

As for a shape of the half pads 110a and 110b of the pad member 110 having cooling capability of the cutting mechanism 100, a pair of half pads which has a shape of a roller may be used.

It is noted that the cutting mechanism 140 can be applied to a process for cutting a monolayer.

Cutting Mechanism in Third Modification

Figure 22:
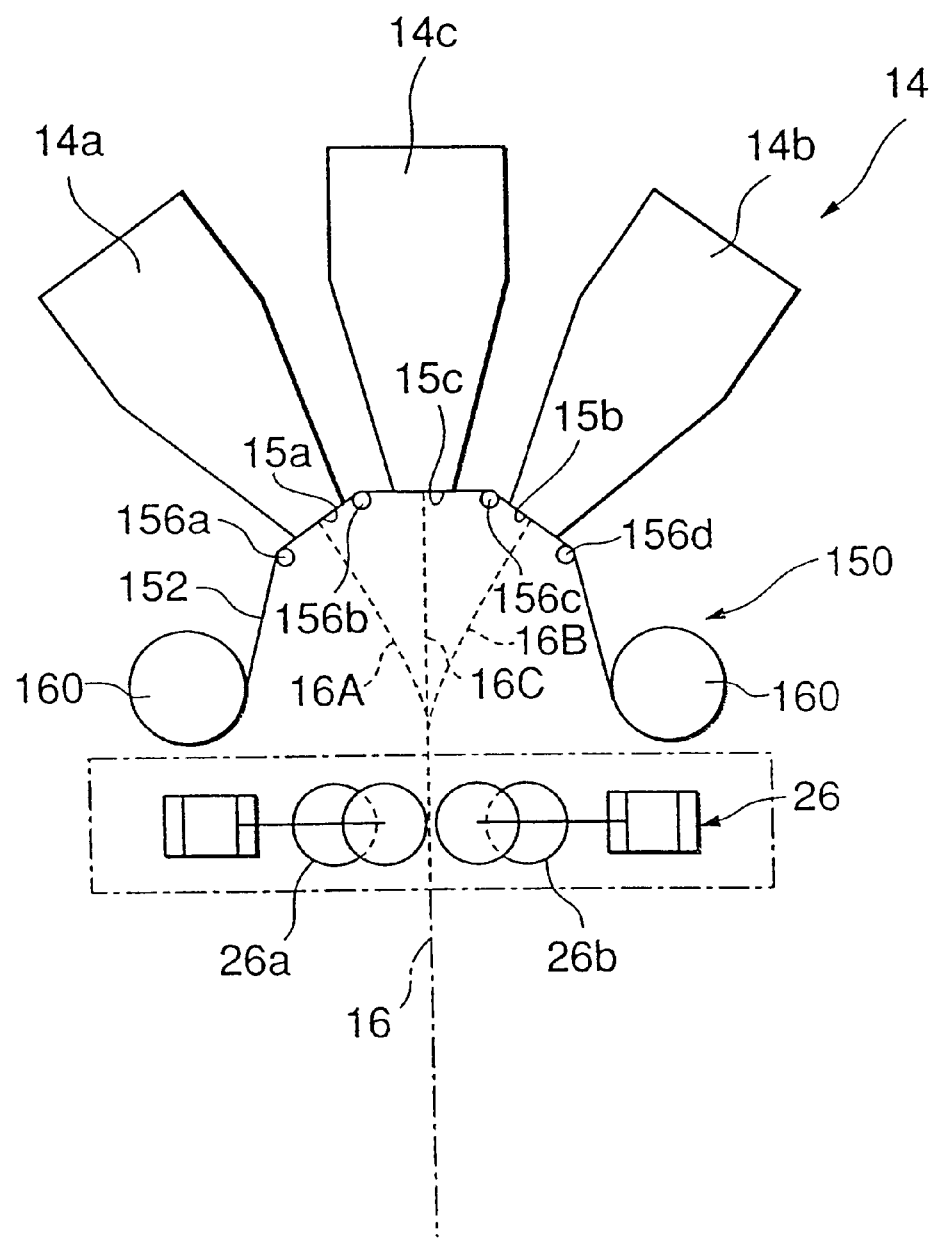
FIG. 22 is a schematic sectional view of a sheet cutting mechanism included in a molded multilayer article manufacturing apparatus in a third embodiment according to the present invention.

FIG. 22 shows a cutting mechanism 150 in a third modification.

The cutting mechanism 150 according to the third modification differs from the cutting mechanisms 100 and 140 both in disposition and configuration. The cutting mechanism 150 is capable of cutting the monolayers 16A, 16B and 16C at positions immediately below the die openings of the T dies 14a, 14b and 14c of the multiple T die 14 before the monolayers 16A, 16B and 16C are laminated. Therefore, the laminating mechanism 26 is disposed below the cutting mechanism 150 with respect to the traveling direction of the intermediate molten multilayer 16.

The cutting mechanism 150 is provided with a metal wire 152, preferably, a piano wire, as a cutting means. The metal wire 152 is extended in contact with or close to exits 15a, 15b and 15c of slot openings the T dies 14a, 14b and 14c through which the monolayers 16A, 16B and 16C are extruded. The metal wire 152 is extended by four guide bars 156a, 156b, 156c and 156d so as to be in contact with the exits 15a, 15b and 15c of the slot openings of the T dies 14a, 14b and 14c. The metal wire 152 is extended by the four guide bars 156a, 156b, 156c and 156d in a plane perpendicular to the width of the monolayers 16A, 16B and 16C.

Figure 23:
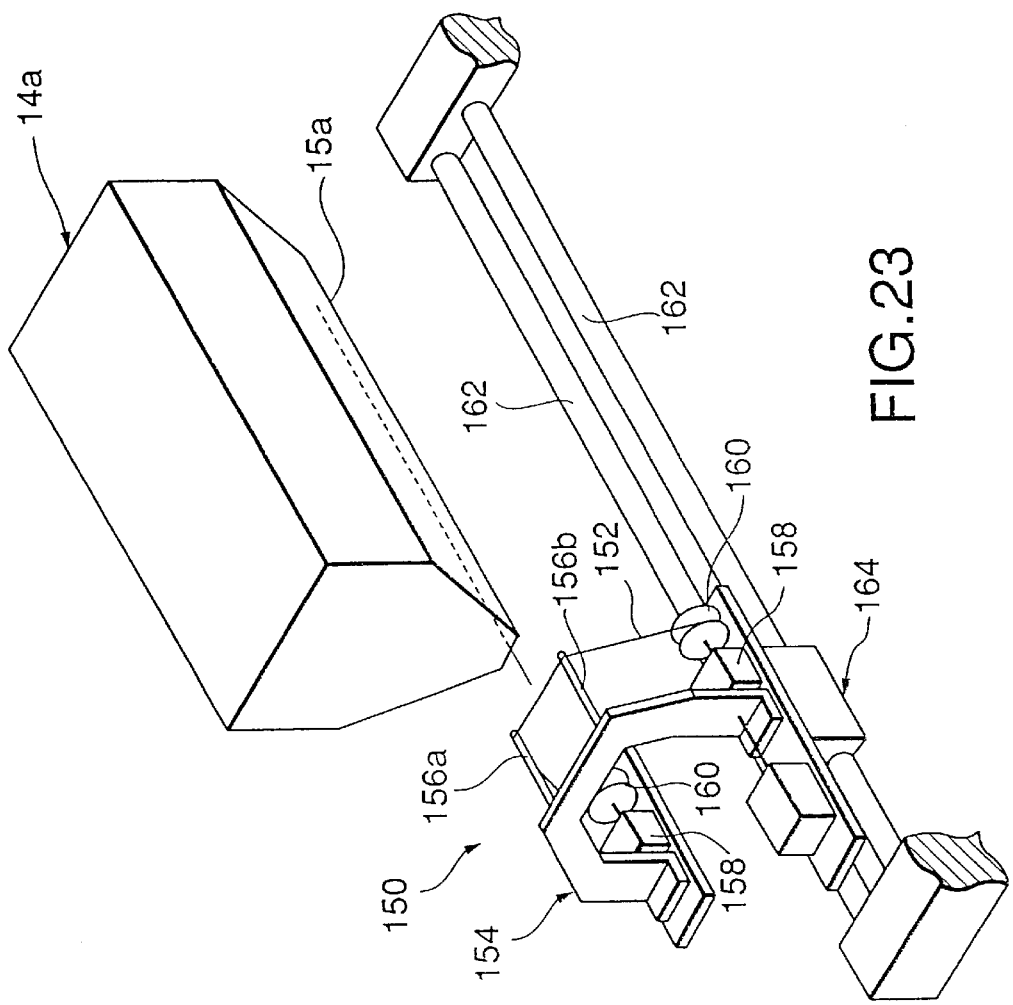
FIG. 23 is a schematic perspective view of the sheet cutting mechanism of FIG. 22.

As shown in FIG. 23, the guide bars 156a, 156b, 156c and 156d are held on a frame 154. In FIG. 23, only the T die 14a of the multiple T die 14 is shown for simplicity. The metal wire 152 is extended between a pair of reels 160 respectively driven for rotation by drive motors 158. One of the pair of reels 160 is a feed reel for feeding the metal wire 152 and the other is a take-up reel for taking up the metal wire 152. A predetermined length of the metal wire 152 is fed out from the feed reel 160 and is taken up by the takeup reel 160 for every molding cycle to take up a used section of the metal wire 152 and to feed a new section of the metal wire 152 for the next molding cycle.

A metal wire moving mechanism for moving the metal wire 152 extended between the reels 160 along the width of the monolayers 16A, 16B and 16C will be described below.

The frame 154, the drive motors 158 and the reels 160 are mounted on a slide block 164 which is supported for sliding along the width of the monolayers 16A, 16B and 16C on guide rails 162. In this modification, the slide block 164 is a rodless cylinder.

The metal wire 152 is preferably heated beforehand by a suitable heating means so that the intermediate molten multilayer 16 will be easily cut thereby. And it is effective to employ a Nichrome wire for the metal wire 152 which generates heat when electrical power is applied.

The action of the cutting mechanism 150 will be described in connection with a cutting method. The monolayers 16A, 16B and 16C are extruded through the T dies 14a, 14b and 14c of the multiple T die 14. The slide block 164 kept on standby near one side end of the monolayers 16A, 16B and 16C starts sliding movement along the guide rails 162. The metal wire 152 move along the width of the monolayers 16A, 16B and 16C in contact with the exits 15a, 15b and 15c of the slot openings of the T dies 14a, 14b and 14c. Consequently, the monolayers 16A, 16B and 16C are cut to a predetermined length simultaneously at the die openings of the T dies 14a, 14b and 14c. Thus, the remains of monolayers 16A, 16B and 16C will not be left on the exit 15a, 15b and 15c of the slot openings of the T dies 14a, 14b and 14c because the parts of the monolayers 16A, 16B and 16C continuous with the exits 15a, 15b and 15c of the slot openings of the T dies 14a, 14b and 14c are cut with the metal wire 152. After cutting the monolayers 16A, 16B and 16C, a section of the metal wire 152 used for cutting them is taken up on the take-up reel 160 and a new section of the metal wire 152 is extended for the next cutting cycle. Thus, the monolayers 16A, 16B and 16C can be smoothly cut in the next cutting cycle with the new section of the metal wire 152 which is not caked with the molten polymer.

The pieces of the cut off monolayers 16A, 16B and 16C are nipped between the nip rollers 26a and 26b for lamination to provide an intermediate molten multilayer 16. The intermediate molten multilayer 16 is delivered to the bottom half mold 24b of the compression molding machine 18.

Figure 24:
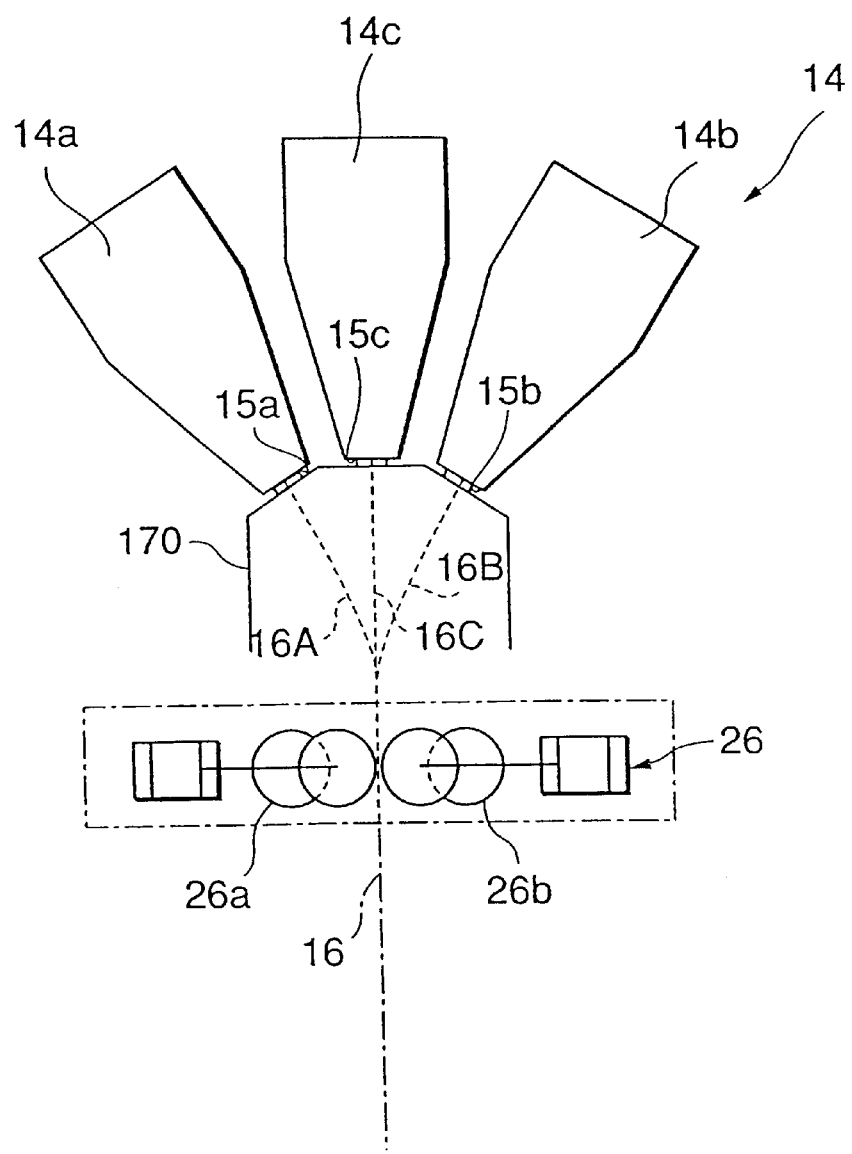
FIG. 24 is a schematic sectional view of a modification of the sheet cutting mechanism of FIG. 22.
Figure 25:
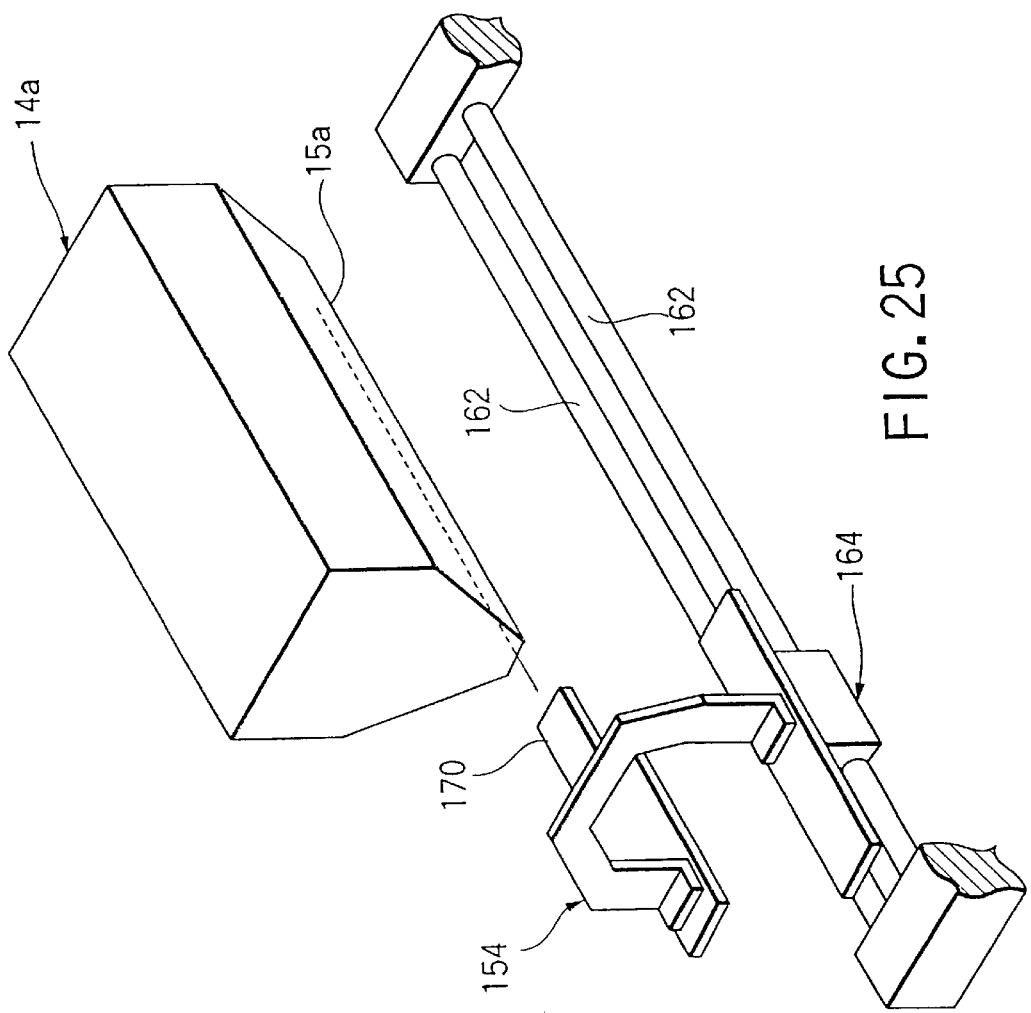
FIG. 25 is a schematic perspective view of the sheet cutting mechanism of FIG. 24.

FIGS. 24 and 25 shows a cutting mechanism similar in construction to the cutting mechanism 150. The cutting mechanism shown in FIGS. 24 and 25 employs a metal thin plate 170 instead of the metal wire 152. As shown in FIG. 24, the metal thin plate 170 is bent and shaped so as to be in contact simultaneously with the end surfaces 15a, 15b and 15c of the T dies 14a, 14b and 14c in which the die openings thereof open. In FIG. 25, only the T die 14a of the multiple T die 14 is shown for simplicity. The metal thin plate 170 is held on the frame 154 capable of moving along the width of the monolayers 16A, 16B and 16C. In FIG. 25, parts like or corresponding to those shown in FIG. 23 are designated by the same reference characters and the description thereof will be omitted.

Cutting Process and Cutting Mechanism in Fourth Modification

Figure 26A:
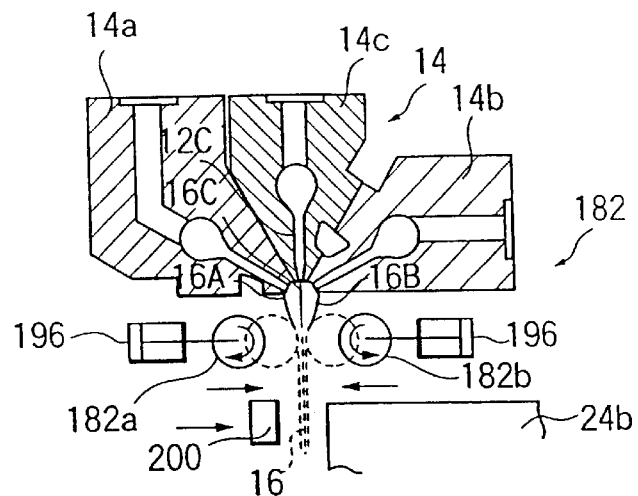
FIGS. 26(a), 26(b) and 26(c) are schematic sectional views of a sheet cutting mechanism included in a molded multilayer article manufacturing apparatus in a fourth embodiment according to the present invention in different phases of operation.
Figure 26B:
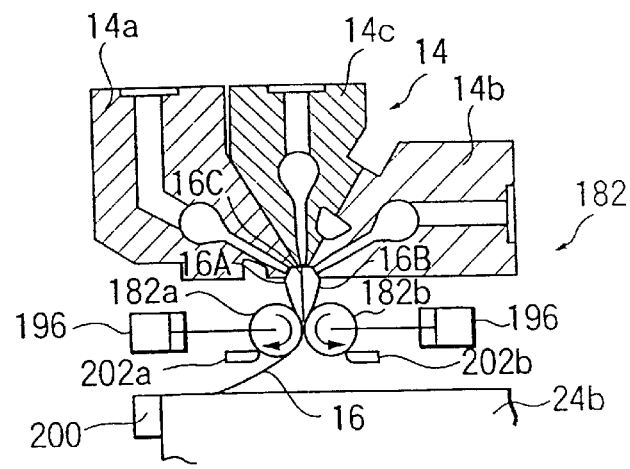
Figure 26C:
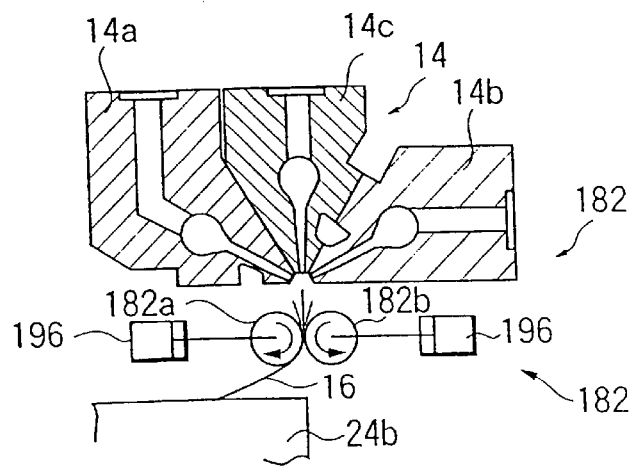

FIGS. 26(a), 26(b) and 26(c) shows different phases of a cutting process for the intermediate molten multilayer 16 which is different from the cutting process of the foregoing embodiments. This cutting process does not use any cutting means. Alternatively, a piece of the intermediate molten multilayer 16 is pulled off by using the nip rollers 182a and 182b of a laminating mechanism 182 so that a part of the monolayers 16A, 16B and 16C near the die openings of the T dies 14a, 14b and 14c is torn off.

The laminating mechanism 182 for laminating the monolayers 16A, 16B and 16C extruded through the T dies 14a, 14b and 14c of the multiple T die 14 to form the intermediate molten multilayer 16 is disposed below the multiple T die 14.

The laminating mechanism 182 serves also so as a pulling and cutting means for pulling the intermediate molten multilayer 16 and tearing it off at the die openings of the T dies 14a, 14b and 14c.

Referring to FIGS. 26(a), 26(b) and 26(c), the pair of nip rollers 182a and 182b are disposed opposite to each other near the die openings of the T dies 14a, 14b and 14c. The monolayers 16A, 16B and 16C extruded through the T dies 14a, 14b and 14c are nipped between the nip rollers 182a and 182b so that any air may not be trapped between the laminated layers to form the intermediate molten multilayer 16. The nip rollers 182a and 182b, similarly to those of the foregoing embodiments, move together with the multiple T die 14.

Figure 27:
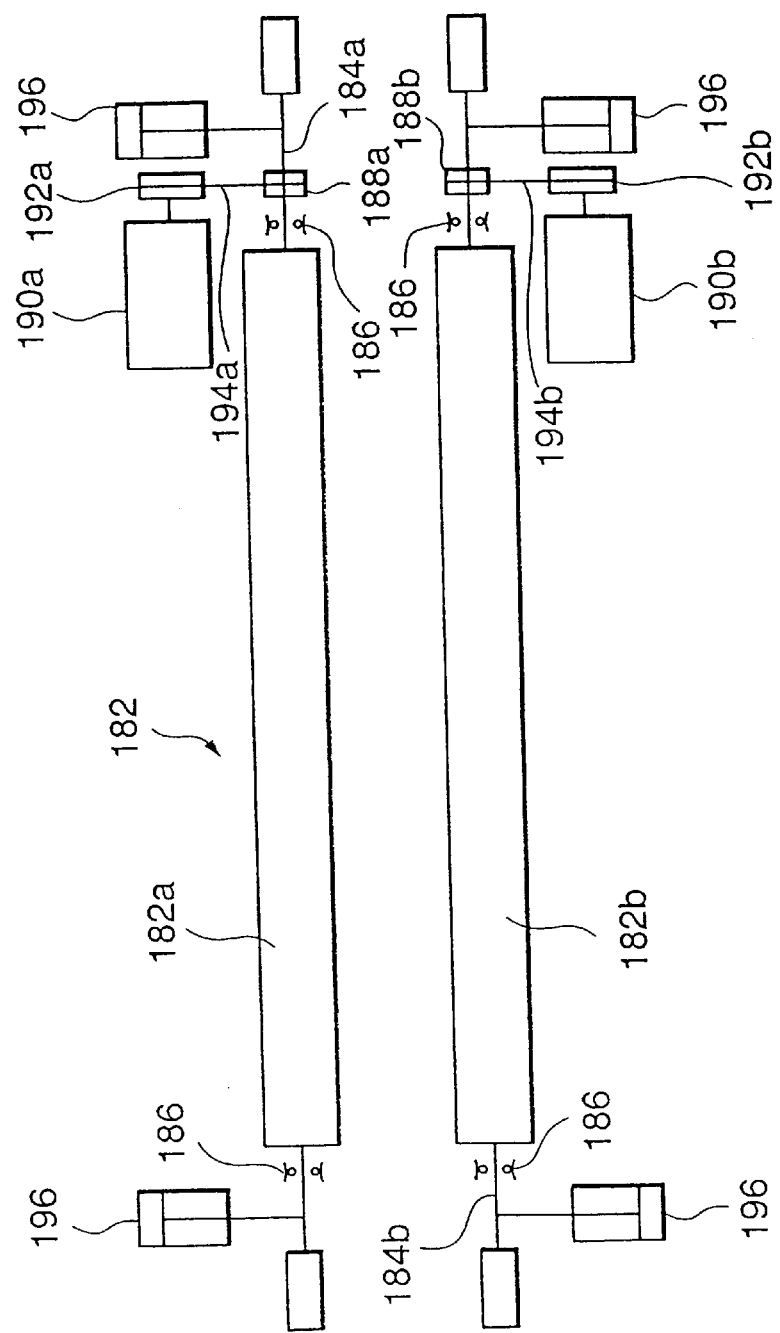
FIG. 27 is a schematic plan view of assistance in explaining the arrangement of the sheet cutting mechanism of FIG. 26.

Referring to FIG. 27 showing the laminating mechanism 182, support shafts 184a and 184b projecting from the opposite ends of the pair of nip rollers 182a and 182b are supported for rotation in bearings 186, respectively. Driven pulleys 188a and 188b are mounted on the support shafts 184a and 184b, respectively, and drive pulleys 192a and 192b are mounted on the output shafts of drive motors 190a and 190b at positions opposite the driven pulleys 188a and 188b, respectively. Synchronous belts 194a and 194b are wound around the driven pulley 188a and the drive pulley 192a, and around the driven pulley 188b and the drive pulley 192b, respectively. A actuators 196, such as pneumatic cylinder actuators, are connected properly to the support shafts 184a and 184b to move the opposite nip rollers 182a and 182b toward and away from each other.

Operations of the multiple T die 14, and the nip rollers 182a and 182b during a laminating process and a cutting process will be described hereinafter.

As shown in FIG. 26(a), the monolayers 16A, 16B and 16C are extruded through the T dies 14a, 14b and 14c while the multiple T die 14 is being advanced. Upon the detection of the leading edges of the monolayers 16A, 16B and 16C which past the space between the nip rollers 182a and 182b by a sensor, not shown, the actuators 196 move the nip rollers 182a and 182b toward each other. The monolayers 16A, 16B and 16C are compressed between the nip rollers 182a and 182b so that the intermediate molten multilayer 16 is formed.

The multiple T die 14 is advanced to a position corresponding to the front ends of the mold 24a, 24b of the compression molding machine 18 as shown in FIG. 26(a). The drive motors 190a and 190b drives the nip rollers 182a and 182b for rotation in the directions of the arrows, respectively. Consequently, the leading edge of the intermediate molten multilayer 16 reaches one end of the bottom half mold 24b. Upon the detection of the arrival of the leading edge of the intermediate molten multilayer 16 by a suitable sensor, not shown, a holding member 200 included in the mold changing device 36 is operated to hold a end portion of the intermediate molten multilayer 16 fixedly on one end of the bottom half mold 24b.

Subsequently, as shown in FIG. 26(b), the multiple T die 14 is moved backward together with the laminating mechanism 182. The nip rollers 182a and 182b are rotated at a rotating rate corresponding to the moving rate of the multiple T die 14 in order that a laminating rate at which the intermediate molten multilayer 16 is delivered coincides with a feed rate at which the multilayer 16 is fed onto the bottom half mold 24b.

As shown in FIG. 26(c), upon the arrival of the multiple T die 14 at a position at a short distance from a position corresponding to the back ends of the mold 24a, 24b, the extrusion of the molten polymers through the T dies 14a, 14b and 14c of the multiple T die 14 is suspended and, at the same time, the rotation of the nip rollers 182a and 182b holding the intermediate molten multilayer 16 therebetween is stopped. Then, the rotation of the nip rollers 182a and 182b is resumed at the rotating rate for delivering the intermediate molten multilayer 16 or at a rotating rate suitable for tearing it off. Consequently, That makes it possible to tear off monolayers 16A, 16B and 16C simultaneously at the die openings of the T dies 14a, 14b and 14c. The cut edges of the monolayers 16A, 16B and 16C are welded together. After the monolayers 16A, 16B and 16C has been cut, the rotation of the nip rollers 182a and 182b is suspended, and the nip rollers 182a and 182b are moved away from each other. The multiple T die 14 retreats beyond the back ends of the mold 24a, 24b to its standby position. Meanwhile, the compression molding machine 18 operates for compression molding to form the intermediate molten multilayers 16 into a molded multilayer article.

Preferably, the surface of the nip rollers 182a and 182b are coated with anti-adhesive coatings to avoid the adhesion of the molten polymers. Preferably, the nip rollers 182a and 182b are internally provided with temperature control means including coolant passages, not shown, to keep the nip rollers 182a and 182b at a predetermined temperature while the intermediate molten multilayer 16 is held between the nip rollers 182a and 182b. Scrapers 202a and 202b may be disposed in combination with the nip rollers 182a and 182b as shown in FIG. 26(b) or blowing means may be combined with the nip rollers 182a and 182b to ensure the separation of the intermediate molten multilayer 16 from the nip rollers 182a and 182b.

Thus, the monolayers 16A, 16B and 16C extruded through the T dies 14a, 14b and 14c of the multiple T die 14 can be laminated by compressing the same between the nip rollers 182a and 182b to form the intermediate molten multilayer 16. Since the nip rollers 182a and 182b pulls monolayers 16A, 16B and 16C tear them off at the die openings of the T dies 14a, 14b and 14c, any air may not be trapped between the laminated monolayers 16A, 16B and 16C. Accordingly, the intermediate molten multilayer 16 properly laminated can be smoothly delivered to the mold of the compression molding machine 18.

Cutting Mechanism in Fifth Modification

Figure 28:
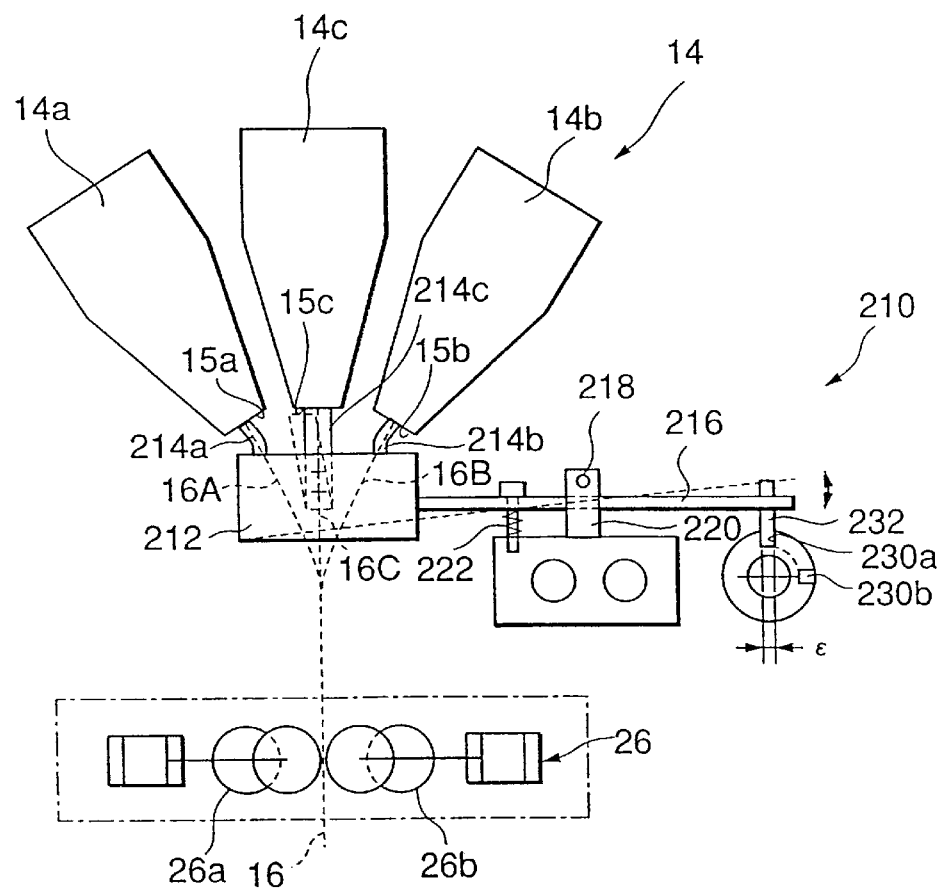
FIG. 28 is a schematic sectional view of a sheet cutting mechanism included in a molded multilayer article manufacturing apparatus in a fifth embodiment according to the present invention.
Figure 29:
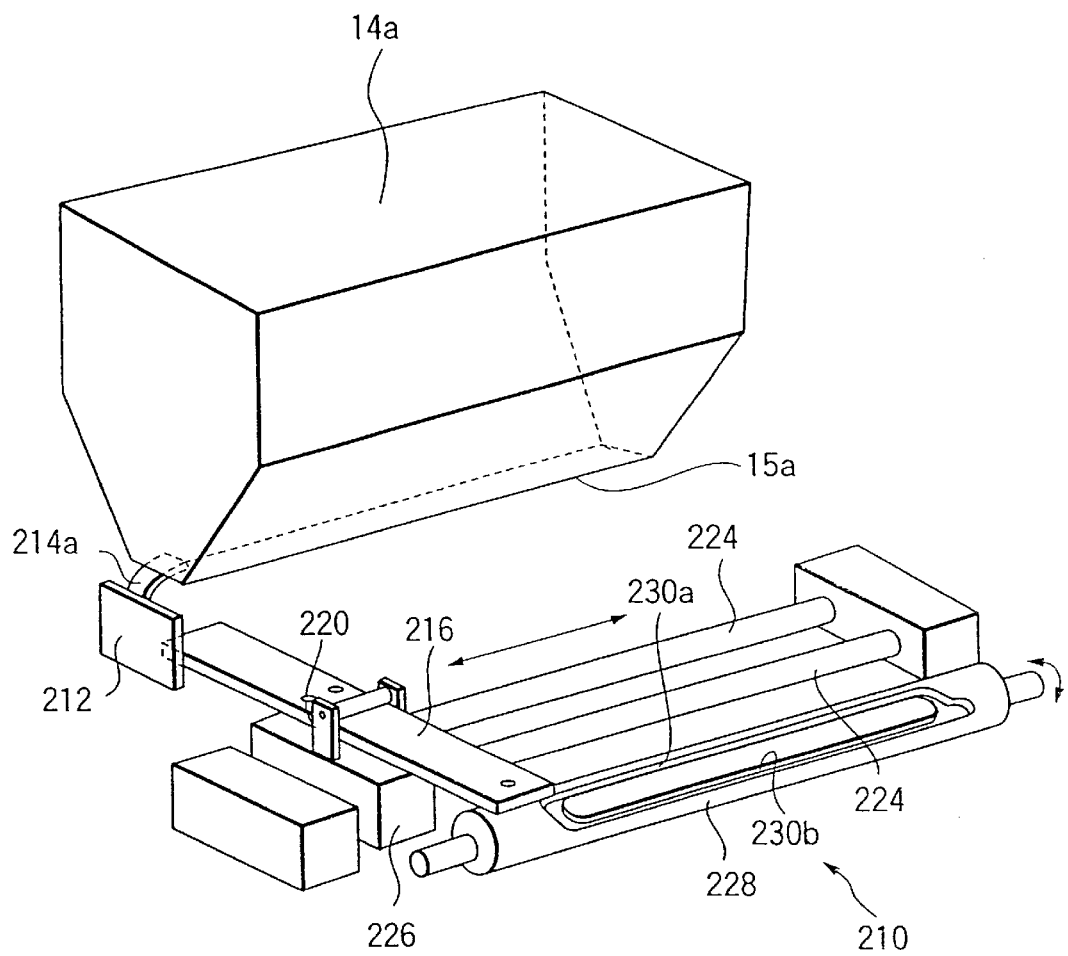
FIG. 29 is a schematic perspective view of the sheet cutting mechanism of FIG. 28.

FIGS. 28 and 29 show a cutting mechanism 210 in a fifth modification.

The cutting mechanism 210 have basically a similar function to that of the cutting mechanism 150 in the third modification which is capable to cutting the monolayers 16A, 16B and 16C at the die openings of the T dies 14a, 14b and 14c of the multiple T die 14 before the monolayers 16A, 16B and 16C are laminated.

Referring to FIG. 28, cutting members 214a, 214b and 214c are held on a bracket 212 which is attached to a front end of a swing plate 216. The swing plate 216 is supported for swinging by a support shaft 218 on brackets 220.

The swing plate 216 is turned to bring the cutting members 214a, 214b and 214c into contact with or to separate the same from the exits 15a, 15b and 15c of the slot openings of the T dies 14a, 14b and 14c in which the die openings open. The swing plate 216 is forced by a spring 222 to bring the cutting members 214a, 214b and 214c into contact with the end surfaces 15a, 15b and 15c of the T dies 14a, 14b and 14c, respectively.

The cutting members 214a, 214b and 214c, the bracket 212, the swing plate 216, the support shaft 218 and the brackets 220 constitute a cutting unit. A cutter moving mechanism for moving the cutting unit is shown in FIG. 29, in which only the T die 14a of the multiple T die 14 is shown for simplicity.

The brackets 220 of the cutting unit is attached to a slide block 226 supported for sliding on guide rails 224 extended in parallel to the width of the monolayers 16A, 16B and 16C. In this modification, a rodless cylinder unit is applicable to the the slide block 226.

An eccentric guide bar 228 is extended with its geometric center axis in parallel to the guide rails 224. The eccentric guide bar 228 is provided in its circumference with a first cam groove 230a and a second cam groove 230b extending in the longitudinal direction. A cam follower 232 fixed to the swing plate 216 is in engagement with the first cam groove 230a as shown in FIG. 28.

In FIG. 29, the slide block 226 is at its standby position. When the slide block 226 is moved forward for a cutting stroke to cut the monolayers 16A, 16B and 16C, the cam follower 232 moves along the first cam groove 230a. When the slide block 226 is moved backward for a return stroke after the monolayers 16A, 16B and 16C have been cut, the cam follower 232 moves along the second cam groove 230b.

Since the cam follower 232 moves along the first cam groove 230a and the second cam groove 230b, the eccentric guide roller 228 is turned through an angle of 90 degrees by every travel of the slide block 226. As is obvious from FIG. 28, the shaft of the eccentric guide roller 228 is displaced by a predetermined eccentricity ϵ from the geometric center of the eccentric guide bar 228 so that the second cam groove 230b is included in a plane including a radius longer than a radius included in a plane including the first cam groove 230a.

The action of the cutting mechanism 210 will be described in connection with a cutting method.

The monolayers 16A, 16B and 16C are extruded through the T dies 14a, 14b and 14c of the multiple T die 14. The slide block 226 starts off on a sliding travel from the standby position along the guide rails 224. At this stage, the eccentric guide bar 228 is at an angular position shown in FIG. 28. As the slide block 226 moves forward for a cutting stroke, the cam follower 232 moves along the first cam groove 230a. Therefore, the cutting members 214a, 214b and 214c held on the bracket 212 attached to the end part of the swing plate 216 move in contact with the exits 15a, 15b and 15c of the slot openings of the T dies 14a, 14b and 14c along the width of the monolayer 16A, 16B and 16C. Consequently, the monolayers 16A, 16B and 16C are cut off simultaneously at the die openings of the T dies 14a, 14b and 14c. Thus, the remains of monolayers 16A, 16B and 16C will not be left on the exits 15a, 15b and 15c of the slot openings of the T dies 14a, 14b and 14c.

In a final stage of the cutting operation, the slide block 226 reaches the front end of the cutting stroke, and the cam follower 232 is forced to move from the first cam groove 230a to the second cam groove 230b and, consequently, the eccentric guide bar 228 is turned counterclockwise, as viewed in FIG. 28, through an angle of 90.

Since the shaft of the eccentric guide bar 228 is displaced from the geometric center of the guide bar 228 by the predetermined eccentricity ϵ, the swing plate 216 is turned slightly counterclockwise, as viewed in FIG. 28, through the cam follower 232. Consequently, the cutting members 214a, 214b and 214c shift its position so as to be apart from the exits 15a, 15b and 15c of the slot openings of the T dies 14a, 14b and 14c.

Then, the slide block 226 is moved backward for return stroke to the standby position with the cam follower 232 being engaged with the second cam groove 230b. The cutting members 214a, 214b and 214c maintains a position apart from the exits 15a, 15b and 15c of the slot openings of the T dies 14a, 14b and 14c. Therefore, the molten polymers oozing through the die openings of the T dies 14a, 14b and 14c will not adhere to the cutting members 214a, 214b and 214c, and the monolayers 16A, 16B and 16C can be smoothly cut with the cutting members 214a, 214b and 214c free from adherent polymers in the next cutting cycle.

The monolayers 16A, 16B and 16C thus cut off are compressed for lamination between the nip rollers 26a and 26b of the laminating mechanism 26 to shape them into an intermediate molten multilayer 16, which is delivered onto the bottom half mold 24b of the compression molding machine 18.

Although the invention has been described in its preferred forms with a certain degree of particularity, various changes and variations may be made in the design thereof without departing from the scope and spirit of the invention.

For example, the molded multilayer article manufacturing apparatus may be provided, instead of the injection molding unit as a plastification means, with an extruder provided with plungers and capable of intermittently extruding molten polymers like the injection molding machine.

The molded multilayer article manufacturing apparatus may be provided with a guide means including guide rails disposed on a fixed plate mounted with the bottom half mold so as to extend over the bottom half mold to guide the multiple T die, the laminating mechanism and the cutting mechanism for simultaneous movement toward and away from the mold of the compression molding machine. The guide means ensures the stable, reliable movement of the multiple T die toward and away from the mold in synchronism with the operation of the injection molding machine. Stable molding operation can be achieved even if the heavy combination of the multiple T die and the laminating mechanism is supported on the delivery nozzles of the injection molding machine in a cantilever fashion.

What is claimed is:

1. A method for manufacturing a molded multilayer article by molding a multilayer sheet consisting of a plurality of polymer layers, comprising:

extruding a plurality of monolayers of molten polymers by forcing the molten polymers into a multiple T die formed by an assembly of T dies so that the molten polymers are extruded from slot openings of respective T dies forming the assembly;

forming an intermediate molten multilayer by superposing and laminating the monolayers extruded through the T dies outside the respective T dies while the polymers are in a molten state of a semi-molten state, feeding the intermediate molten multilayer to a compression mold having the bottom half mold and a top half mold by advancing the multiple T die into a space between the bottom half mold and the top half mold;

cutting the intermediate molten multilayer to a predetermined length; and molding the intermediate molten multilayer in the compression mold into a multilayer article of desired shape, wherein the intermediate molten multilayer is cut at a position below the die slot openings of the T dies of the multiple T die with respect to a direction in which the monolayers are extruded, and wherein a cutting process for cutting the intermediate molten multilayer comprises the steps of:

disposing a pair of pad members at a position below the die slot openings of the T dies of the multiple T die, holding the intermediate molten multilayer between the pair of pad members;

cooling a portion of the intermediate molten multilayer held between the pair of pad members; and cutting the intermediate molten multilayer along the cooled portion thereof.

2. The molded multilayer article manufacturing method according to claim 1, wherein the monolayers extruded through the T dies of the multiple T die include a first monolayer of a mono polymer serving as a skin layer, a second monolayer of a molten polymer serving as a base layer, and at least one third monolayer of a molten polymer serving as a mid-layer sandwiched between the skin layer and the base layer.

3. The molded multilayer article manufacturing method according to claim 2, wherein the first, the second and the third monolayers are of the same molten thermoplastic polymer.

4. The molded multilayer article molding manufacturing method according to claim 2, wherein the temperature of the molten polymer forced into the T die for extruding the third monolayer is lower than those of the molten polymers forced into the T dies respectively for extruding the first and the second monolayer.

5. The molded multilayer article manufacturing method according to claim 4, wherein the third monolayer is formed of a molten unfoamed polymer containing a foaming agent.

6. The molded multilayer article manufacturing method according to claim 2, wherein the thermoplastic polymer is a polyolefin.

7. The molded multilayer article manufacturing method according to claim 2, wherein each of the monolayers are extruded through the corresponding T die with a predetermined pattern of varying width.

8. The molded multilayer article manufacturing method according to claim 7, wherein the monolayers have different patterns of varying width, respectively.

9. The molded multilayer article manufacturing method according to claim 1, wherein the monolayers are laminated near the die slot openings of the T dies so that the monolayer serving as the mid-layer is sandwiched between the monolayers respectively serving as the skin and base layers.

10. The molded multilayer article manufacturing method according to claim 1, wherein the intermediate molten multilayer is delivered to the compression mold by cutting it into a predetermined length at a position between an open top half mold and a bottom half mold of the compression mold.

11. The molded multilayer article manufacturing method according to claim 1, further comprising blowing air from within the bodies of pad members against the intermediate molten multilayer to facilitate the separation from the pad members on completion of cutting the intermediate multilayer.

12. The molded multilayer article manufacturing method according to claim 1, wherein the intermediate molten multilayer comprises a first monolayer sheet of a molten plastics serving as a skin layer, a second monolayer sheet of a molten plastics serving as a base layer, and at least one third monolayer sheet of an unfoamed molten plastics containing a foaming agent, serving as a mid-layer sandwiched between the skin layer and the base layer; and said compression molding process comprises the steps of: compressing the intermediate molten multilayer in the compression mold, heating the compression mold to make the mid-layer produce foams, cooling the compression mold, and opening the compression mold and taking out a molded multilayer article from the compression mold.

13. The molded multilayer article manufacturing method according to claim 12, wherein the compression molding process further comprises the steps of: replacing the compression mold with another compression mold in which the intermediate multilayer is putted before heating the former, compressing the latter mold to shape the intermediate multilayer into a molded multilayer article.

* * * * *